(12) United States Patent
Fukuba et al.

(10) Patent No.: US 12,198,087 B2
(45) Date of Patent: *Jan. 14, 2025

(54) MODULAR SYSTEM FOR FOOD ASSEMBLY

(71) Applicant: Hyphen Technologies, Inc., San Jose, CA (US)

(72) Inventors: Daniel Fukuba, San Jose, CA (US); Taylor Miyamoto-Kim, San Jose, CA (US); Alexander Malin, Bradford, ME (US); Archana Kashikar, San Carlos, CA (US)

(73) Assignee: Hyphen Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/744,235

(22) Filed: Jun. 14, 2024

(65) Prior Publication Data

US 2024/0330813 A1 Oct. 3, 2024

Related U.S. Application Data

(63) Continuation-in-part of application No. 18/406,656, filed on Jan. 8, 2024, which is a continuation of
(Continued)

(51) Int. Cl.
*B65G 37/00* (2006.01)
*A23L 5/10* (2016.01)
(Continued)

(52) U.S. Cl.
CPC .......... *G06Q 10/06316* (2013.01); *A23L 5/10* (2016.08); *A47J 44/00* (2013.01);
(Continued)

(58) Field of Classification Search
CPC ...... A47J 27/004; A47J 36/165; A47J 43/046; A47J 27/002; A47J 43/044; A47J 43/082;
(Continued)

(56) References Cited

U.S. PATENT DOCUMENTS

2005/0073225 A1* 4/2005 Kwon ................... F25D 25/025
312/402
2005/0206282 A1* 9/2005 Walburn .............. A47B 46/005
312/312
(Continued)

OTHER PUBLICATIONS 1993 subway restaurants training video about food assembly youtube video https://www.youtube.com/watch?v=sW3-gwCQK6o published on Jul. 14, 2020 pertinent disclosure 3:43-3:51, 4:52-5:10, 24:16-25:31 and 27:35-28:21 (Year: 2020).*

*Primary Examiner* — Eric S Stapleton
*Assistant Examiner* — Yeong Juen Thong
(74) *Attorney, Agent, or Firm* — Run8 Patent Group, LLC; Peter Miller; Leah Raddatz

(57) ABSTRACT

One variation of a food production system includes a controller and a module housing: configured to transiently house a food-dispensing module configured to store and dispense units of an ingredient toward an autonomous assembly zone; and including a positioner module, arranged within the autonomous assembly zone, including a platform configured to receive and support a food container, a set of positioner arms configured to support and move the platform across an assembly plane to position the food container below food-dispensing modules, and a set of actuators configured to transiently engage the set of positioner arms. The controller is configured to: receive a food order specifying the ingredient; trigger the set of actuators to rotate the set of positioner arms to move the platform across the assembly plane and locate the food container below the food-dispensing module; and trigger the food-dispensing module to dispense the ingredient into the food container.

17 Claims, 8 Drawing Sheets

Related U.S. Application Data application No. 17/494,743, filed on Oct. 5, 2021, and a continuation of application No. 17/494,736, filed on Oct. 5, 2021.

(60) Provisional application No. 63/521,042, filed on Jun. 14, 2023, provisional application No. 63/087,662, filed on Oct. 5, 2020.

(51) Int. Cl.
    *A47J 44/00*     (2006.01)
    *G05B 19/04*     (2006.01)
    *G06Q 10/0631*     (2023.01)
    *H04L 67/12*     (2022.01)

(52) U.S. Cl.
    CPC ......... *B65G 37/005* (2013.01); *G05B 19/041* (2013.01); *G06Q 10/06311* (2013.01); *H04L 67/12* (2013.01); *A47J 2201/00* (2013.01)

(58) Field of Classification Search
CPC ............. A47J 27/00; A47J 43/0727; A47J 2043/04454; A47J 27/14; A47J 36/06; A47J 36/2483; A47J 36/26; A47J 36/32; A47J 36/34; A47J 37/047; A47J 43/042; A47J 43/06; A47J 43/0716; A47J 43/087; A47J 44/00; A47J 2043/04463; A47J 31/60; A47J 36/321; A47J 37/105; A47J 43/04; A47J 43/0766; A47J 43/0772; A47J 43/0777; A47J 43/08; A47J 43/085; A47J 36/00; A47J 2027/043; A47J 43/0722; G06Q 50/12; G06Q 30/06; G06Q 10/087; G06Q 20/18; G07F 17/0085; B60P 3/0257; B65D 83/06; B65D 25/38; B65D 47/04; G06F 40/30; A47F 1/035; B25J 9/0096; B25J 9/1602; B25J 9/161; B25J 9/1661; B25J 11/0045; B25J 13/006; B25J 15/0608; B65G 65/4881; B65G 3/04; G01F 11/261; G01G 13/026; G05B 19/4147; G05B 2219/40; A47G 19/34; B67D 1/0041; B67D 2210/00076; B67D 2210/00144
USPC ......... 99/325, 326, 331, 337, 338, 342, 352, 99/357, 402–405, 427, 523, 468, 486, 99/280, 356, 390, 494, 448, 449, 516; 219/752, 753, 762, 763; 705/7.26

See application file for complete search history.

(56) References Cited

U.S. PATENT DOCUMENTS

| | | | |
|---|---|---|---|
| 2015/0290795 A1* | 10/2015 | Oleynik | B25J 9/0081 700/257 |
| 2016/0213053 A1* | 7/2016 | Frehn | A23L 5/10 |
| 2019/0069728 A1* | 3/2019 | Alfarra | A23N 12/02 |
| 2020/0012322 A1* | 1/2020 | Jan | E05D 3/18 |
| 2022/0118605 A1* | 4/2022 | Ishizu | B25J 9/0096 |

* cited by examiner

//<br>
MODULAR SYSTEM FOR FOOD ASSEMBLY

CROSS-REFERENCE TO RELATED APPLICATIONS

This application claims the benefit of U.S. Provisional Application No. 63/521,042, filed on 14 Jun. 2023, which is incorporated in its entirety by this reference.

This Application is also a continuation-in-part of U.S. patent application Ser. No. 18/406,656, filed on 8 Jan. 2024, which is a continuation of U.S. patent application Ser. No. 17/494,736, filed on 5 Oct. 2021, and U.S. patent application Ser. No. 17/494,743, filed on 5 Oct. 2021, which claim the benefit of U.S. Provisional Application No. 63/087,662, filed on 5 Oct. 2020, each of which is incorporated in its entirety by this reference.

TECHNICAL FIELD

This invention relates generally to the field of food production and more specifically to a new and useful modular system for manual and autonomous food assembly in the field of food production.

DESCRIPTION OF THE EMBODIMENTS

Figure 1A:
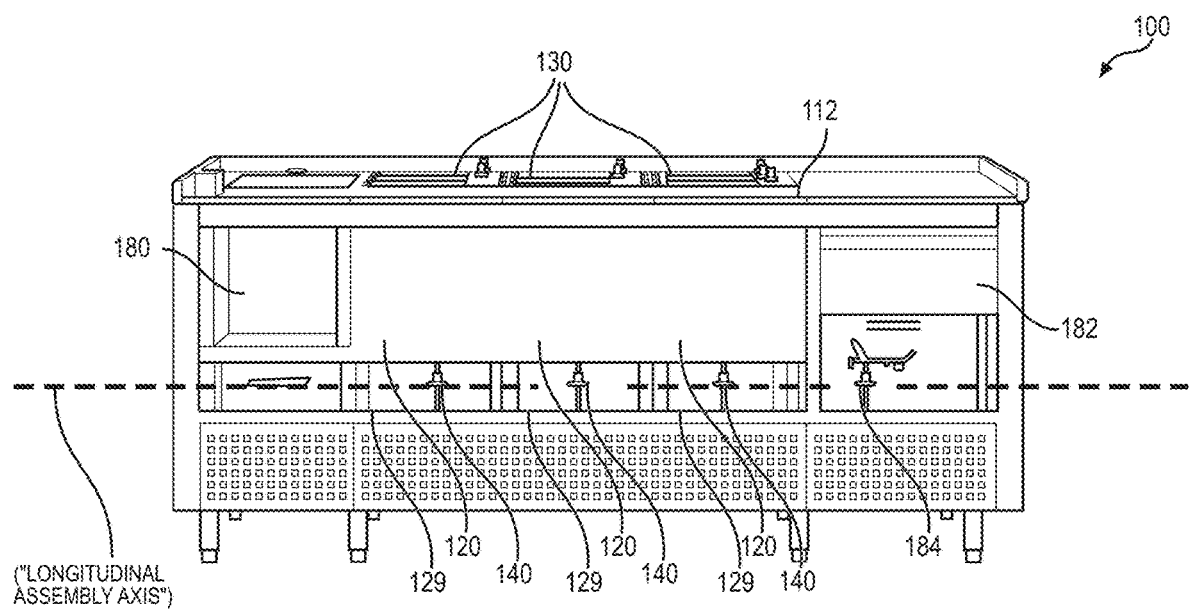
FIGS. 1A and 1B are schematic representation of a food production system.
Figure 1B:
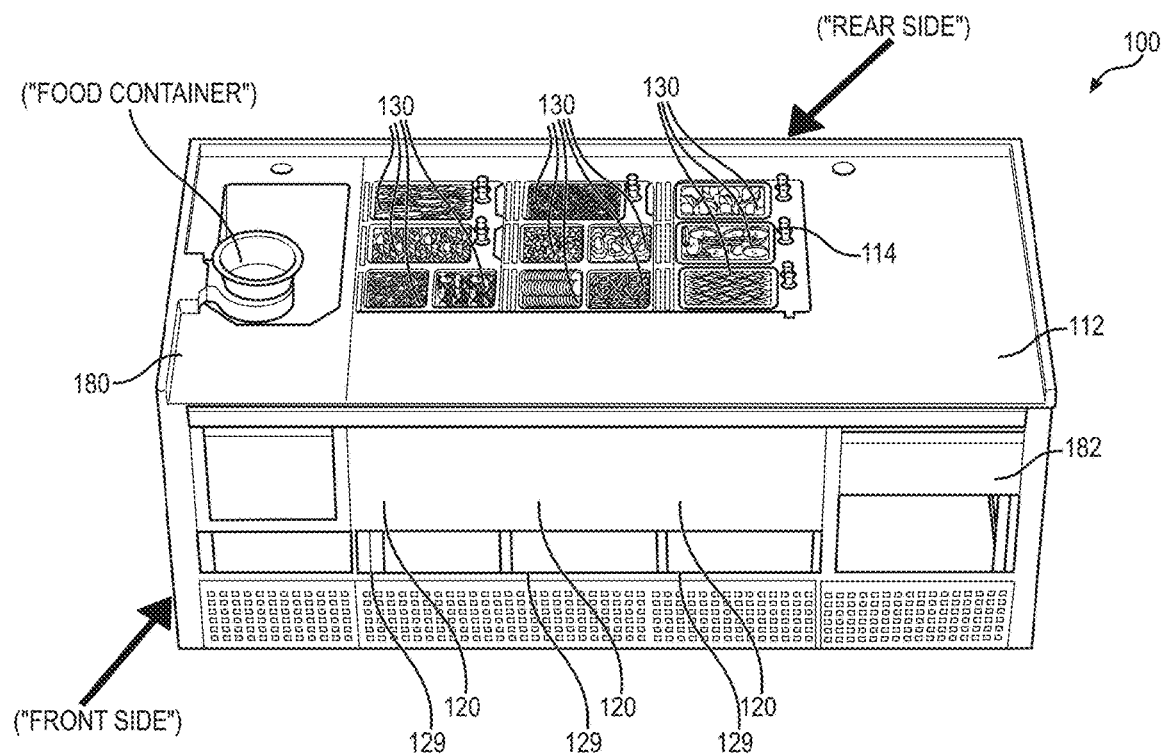

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Food Production System

As shown in FIGS. 1A, 1B, 2, 3, 4A, 4B, 5, 6A, and 6B, a food production system 100 includes: a food preparation surface 112 at work surface height defining a receptacle 114 configured to transiently receive a set of food-dispensing modules 130 configured to store and dispense ingredients for preparation of units of a food product type; and a first module housing 120 supporting the food preparation surface 112.

The first module housing 120: defines an autonomous assembly zone 122 extending along a longitudinal assembly axis arranged below the food preparation surface 112; is configured to transiently house a first food-dispensing module 130, in the set of food-dispensing modules 130, configured to store and dispense units of a first ingredient toward the autonomous assembly zone 122, the first food-dispensing module 130 seated within the receptacle 114 extending toward the autonomous assembly zone 122 within the first module housing 120; and is configured to transiently house a second food-dispensing module 130, in the set of food-dispensing modules 130, configured to store and dispense units of a second ingredient toward the autonomous assembly zone 122, the second food-dispensing module 130 seated within the receptacle 114 and extending toward the autonomous assembly zone 122 within the first module housing 120.

The first module housing 120 includes a first positioner module 140 arranged within the autonomous assembly zone 122 and including: a container platform 146 configured to receive and support a food container; a set of positioner arms 144 configured to cooperate to support and move the container platform 146 across an assembly plane, coplanar the longitudinal assembly axis, to position the food container below food-dispensing modules 130 for dispensation of ingredients into the food container; and a set of arm actuators 142 arranged beneath the assembly plane, each arm actuator 142, in the set of arm actuators 142, defining a driveshaft, in a set of driveshafts, extending upward into the autonomous assembly zone 122 and configured to transiently engage a positioner arm 144, in the set of positioner arms 144, to locate the positioner arm 144 within the autonomous assembly zone 122.

The food production system 100 further includes a controller 160 configured to: receive a food order specifying the first ingredient and the second ingredient; trigger the set of arm actuators 142 to rotate the set of positioner arms 144 to move the container platform 146 across the assembly plane and locate the food container in a first location beneath the first food-dispensing module 130; trigger the first food-dispensing module 130 to dispense the first ingredient into the food container at the first location; trigger the set of arm actuators 142 to rotate the set of positioner arms 144 to move the container platform 146 across the assembly plane and locate the food container in a second location beneath the second food-dispensing module 130; and trigger the second food-dispensing module 130 to dispense the second ingredient into the food container at the second location.

One variation of the food production system 100 includes: a food preparation surface 112 at work surface height; and a first module housing 120 supporting the food preparation surface 112. In this variation, the first module housing 120: defines an autonomous assembly zone 122 arranged below the food preparation surface 112 and extending along a longitudinal assembly axis; is configured to transiently house a first food-dispensing module 130 configured to store and dispense units of a first ingredient toward the autonomous assembly zone 122; and includes a first positioner module 140 arranged within the autonomous assembly zone 122. The first positioner module 140 includes: a container platform 146 configured to receive and support a food container; a set of positioner arms 144 configured to cooperate to support and move the container platform 146 across an assembly plane, coplanar the longitudinal assembly axis, to position the food container below food-dispensing modules 130 for dispensation of ingredients into the food container; and a set of arm actuators 142 arranged beneath the assembly plane, each arm actuator 142, in the set of arm actuators 142, defining a driveshaft, in a set of driveshafts, extending upward into the autonomous assembly zone 122 and configured to transiently engage a positioner arm 144, in the set of positioner arms 144, to locate the positioner arm 144 within the autonomous assembly zone 122. In this variation, the food production system 100 further includes a controller 160 configured to: receive a food order specifying the first ingredient; trigger actuation of the set of positioner arms 144, via the set of arm actuators 142, to move the container platform 146 across the assembly plane and locate the food container in a first location beneath the first food-dispensing module 130; and trigger the first food-dispensing module 130 to dispense the first ingredient into the food container at the first location.

In one variation, the first module housing 120 further defines an outlet 126 arranged coaxial the longitudinal assembly axis. In this variation, the food production system 100 can further include a second module housing 120: defining a second autonomous assembly zone 122 extending along the longitudinal assembly axis; defining an inlet 124 arranged coaxial the longitudinal assembly axis and aligned to the outlet 126 of the first module housing 120; configured to transiently house a second food-dispensing module 130 configured to store and dispense units of a second ingredient toward the autonomous assembly zone 122; and including a second positioner module 140 arranged within the second autonomous assembly zone 122. The second positioner module 140 includes: a second container platform 146 configured to receive and support the food container; a second set of positioner arms 144 configured to cooperate to support and move the second container platform 146 across a second assembly plane, coplanar the longitudinal assembly axis, to position the food container below food-dispensing modules 130 for dispensation of ingredients into the food container; and a second set of arm actuators 142 arranged beneath the second assembly plane, each arm actuator 142, in the second set of arm actuators 142 defining a driveshaft, in a second set of driveshafts, extending upward into the second autonomous assembly zone 122 and configured to transiently engage a positioner arm 144, in the second set of positioner arms 144, to locate the positioner arm 144 within the second autonomous assembly zone 122.

In the preceding variation, the food production system 100 further includes a handoff assembly 150 arranged proximal the outlet 126 and configured to: receive the food container from the container platform 146 of the first positioner module 140; and locate the food container on the second container platform 146 of the second positioner module 140. The controller 160 is configured to: receive the food order specifying the first ingredient and the second ingredient; trigger the second set of arm actuators 142 to rotate the second set of positioner arms 144 to move the second container platform 146 across the second assembly plane and locate the food container in a second location beneath the second food-dispensing module 130; trigger the second food-dispensing module 130 to dispense the second ingredient into the food container at the second location; and trigger the handoff assembly 150 to transfer the food container from the first container platform 146 to the second container platform 146 via the outlet 126 of the first module housing 120 and the inlet 124 of the second module housing 120.

One variation of the food production system 100 for assembling units of a food product type includes: a manual assembly zone 110; an autonomous assembly zone 122; a positioner module 140; and a controller 160.

The manual assembly zone 110 includes: a food preparation surface 112 located at a work surface height; and a receptacle integrated within the food preparation surface 112 that receives a sequence of food hoppers configured to store ingredients.

The autonomous assembly zone 122 includes a sequence of module housings 120 arranged beneath and supporting the food preparation surface 112, each module housing 120 in the sequence of module housings 120: configured to transiently house a food-dispensing module 130, in a sequence of food-dispensing modules 130; configured to dispense ingredients for autonomous preparation of units of a food product; and including a handoff window 156 through which a food container can pass to another module housing 120.

The autonomous assembly zone 122 further includes a sequence of positioner modules 140, each positioner module 140, in the sequence of positioner modules 140, configured to: transiently install within a module housing 120, in the sequence of module housings 120; transfer the food container between the module housing 120 and a subsequent module housing 120 in the sequence of module housings 120; and position the food container below a food-dispensing module 130 of each module housing 120. Each positioner module 140, in the sequence of positioner modules 140, includes: a container platform 146 configured to receive and support the food container on an upper surface of the container platform 146; a set of positioner arms 144 coupled to a lower surface—opposite the upper surface—of the container platform 146 and configured to move the container platform 146 within the module housing 120 to position the food container below food-dispensing modules 130 for dispensation of ingredients into the food container; a handoff assembly 150 arranged within the handoff window 156 of the module housing 120 and configured to transfer the food container from the container platform 146 onto a next container platform 146 of a subsequent positioner module 140 in the sequence of positioner modules 140; and a set of arm actuators 142 configured to drive the set of positioner arms 144 and the handoff assembly 150 to manipulate the food container along the sequence of module housings 120 and beneath the sequence of food-dispensing modules 130 accordingly to assemble a food product in the food container.

The autonomous assembly zone 122 further includes a controller 160 configured to trigger the sequence of food-dispensing modules 130 to dispense ingredients and trigger the set of arm actuators 142 to move the set of positioner arms 144 and the handoff assembly 150 in order to assemble the food product according to a food order submitted by a patron.

2. Method

Figure 2:
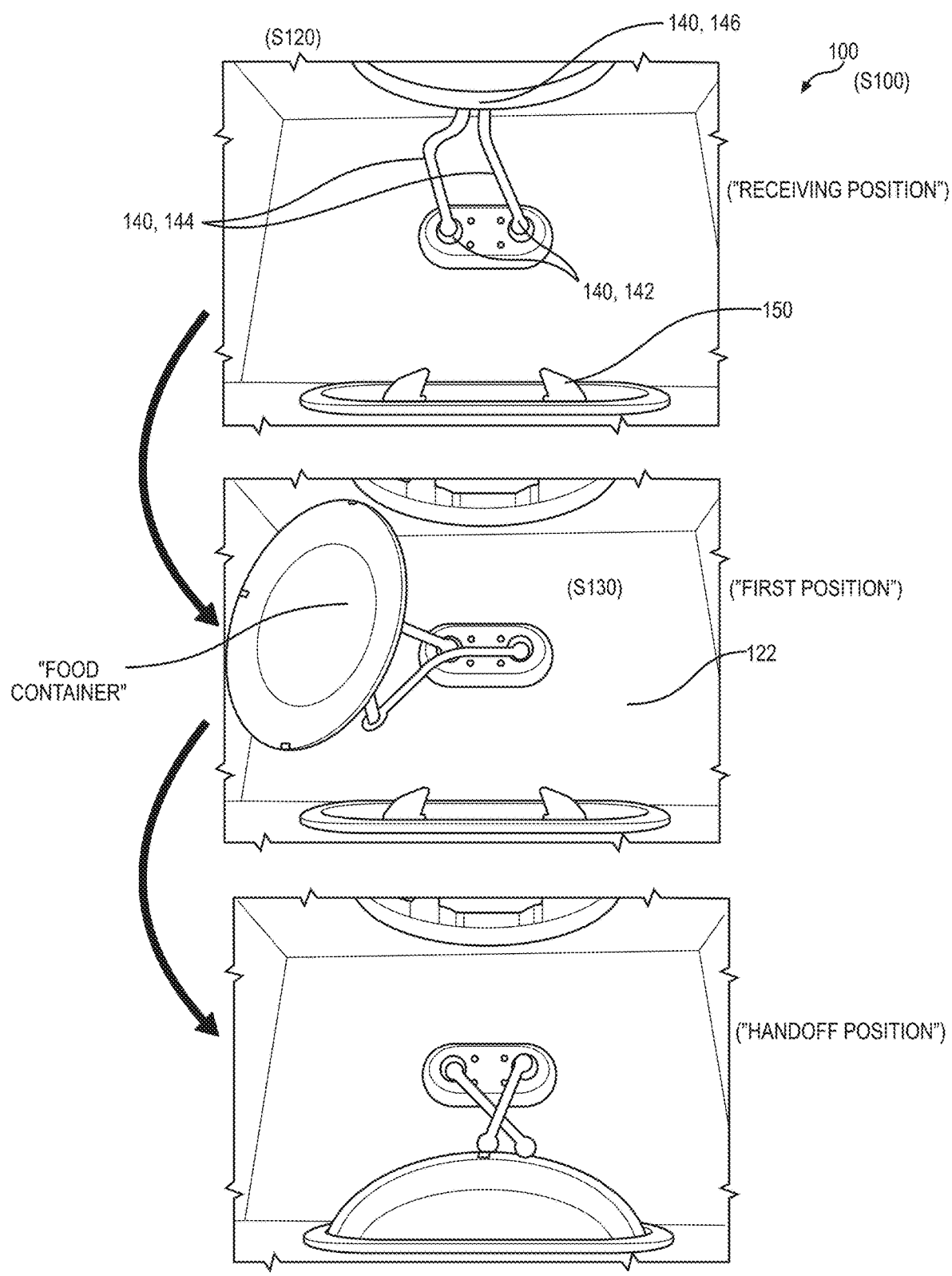
FIG. 2 is a schematic representation of one variation of the food production system.
Figure 3:
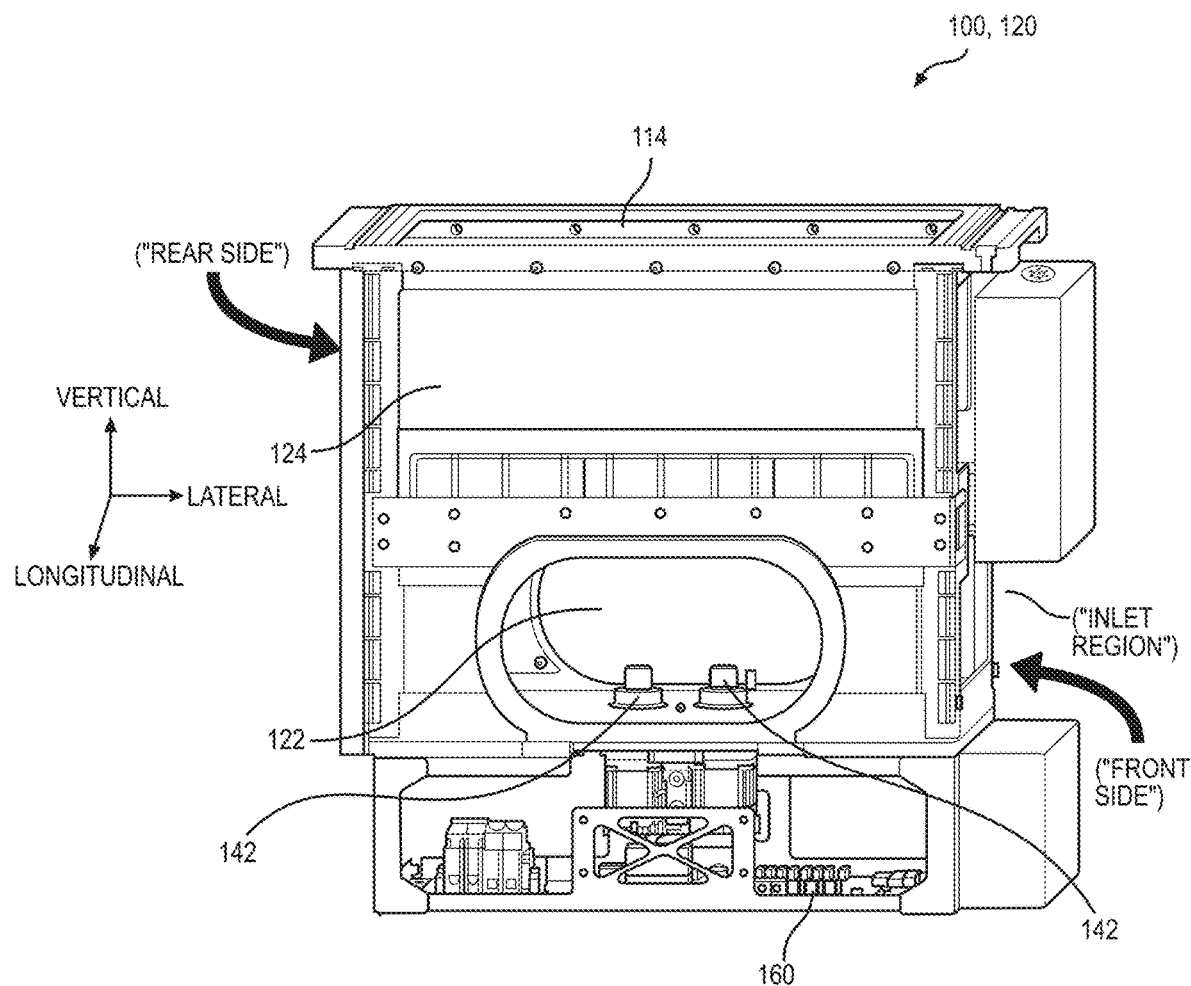
FIG. 3 is a schematic representation of one variation of the food production system.
Figure 4A:
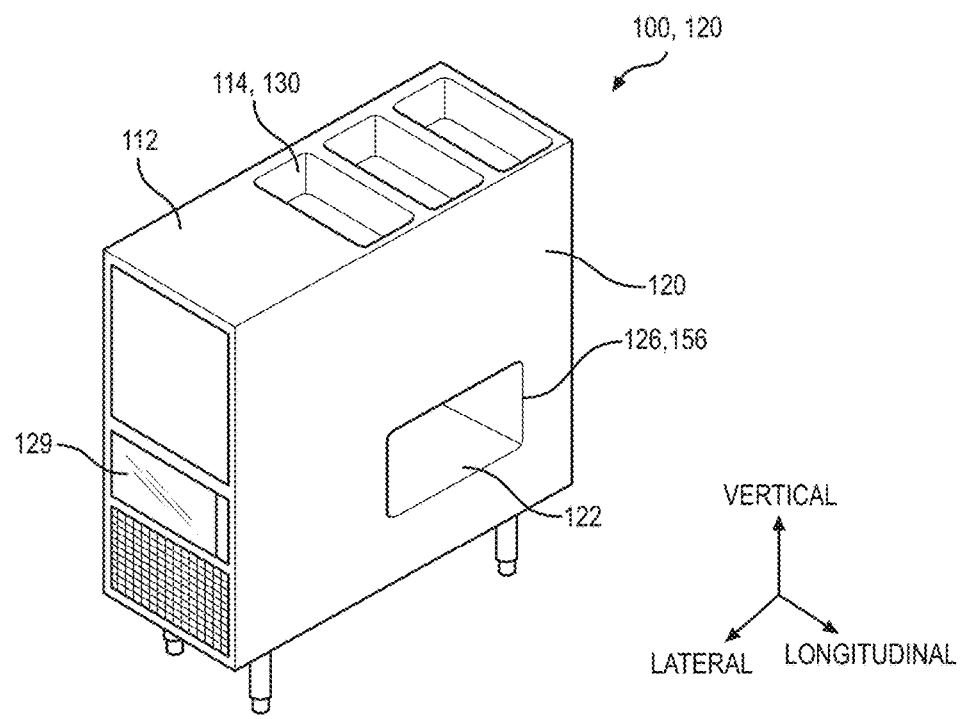
FIGS. 4A and 4B are schematic representations of one variation of the food production system.
Figure 4B:
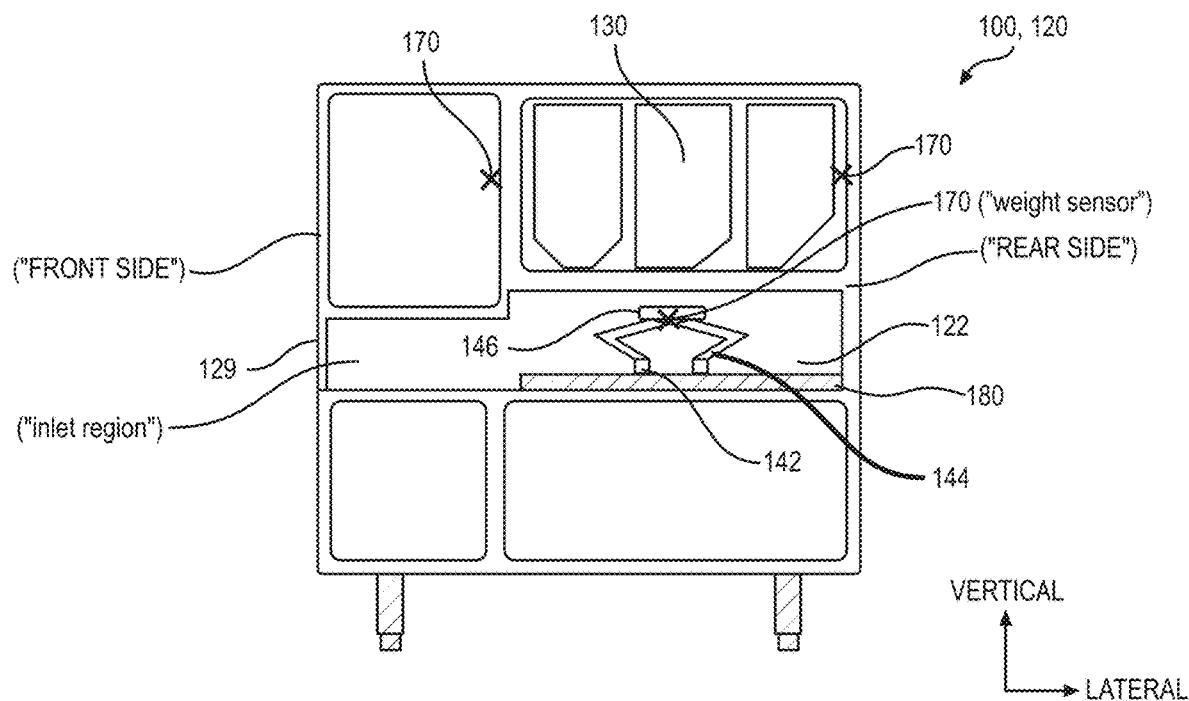
Figure 5:
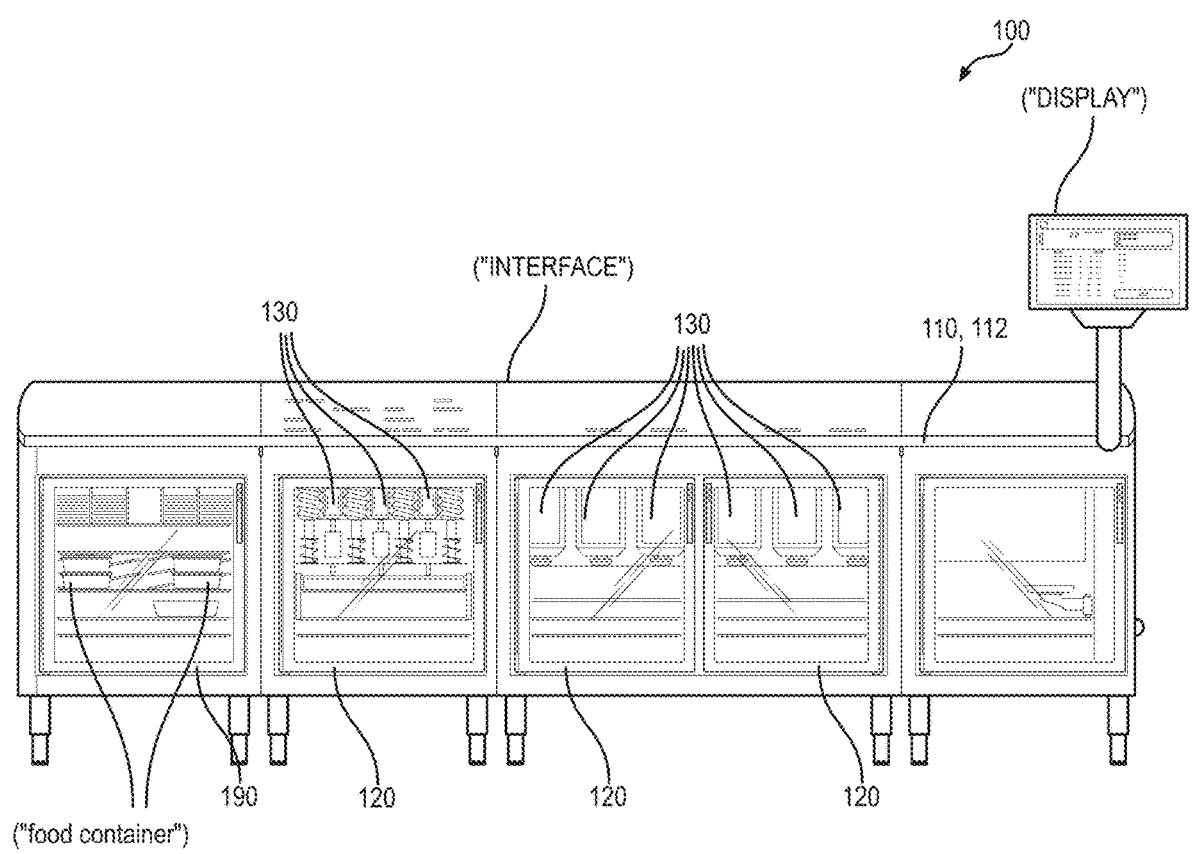
FIG. 5 is a schematic representation of one variation of the food production system.
Figure 6A:
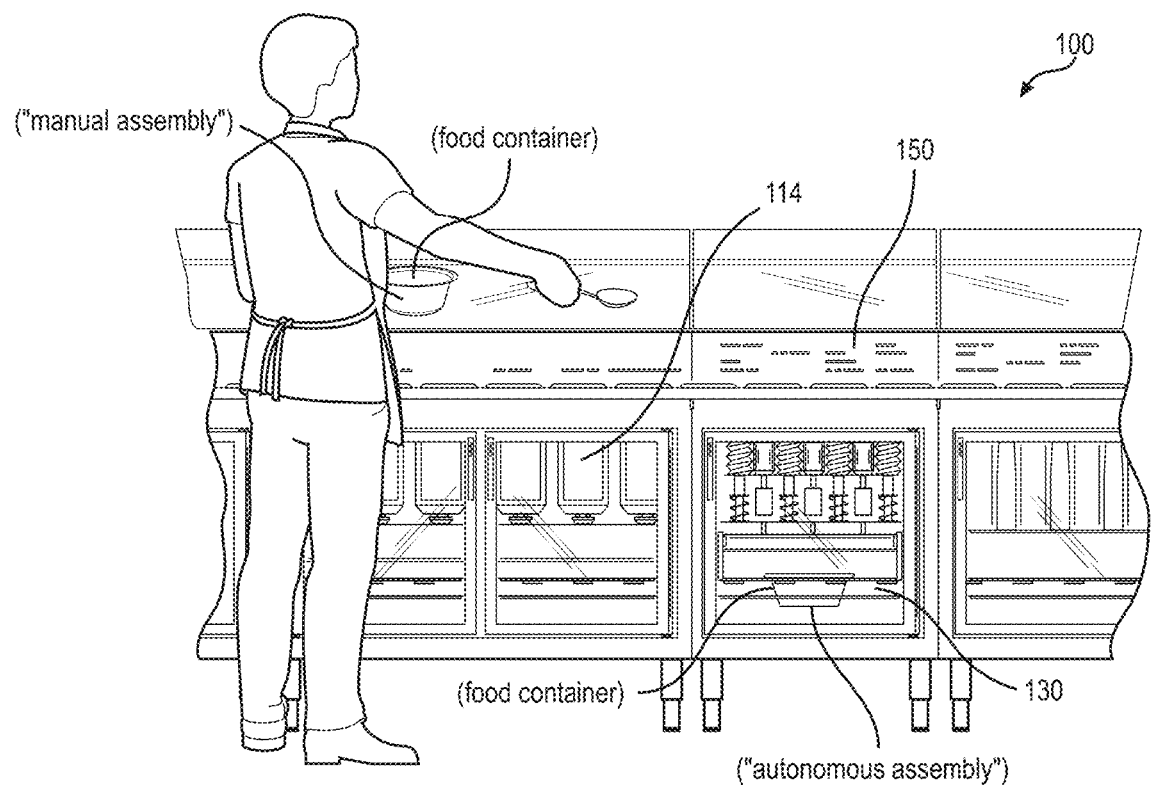
FIGS. 6A and 6B are schematic representations of one variation of the food production system.
Figure 6B:
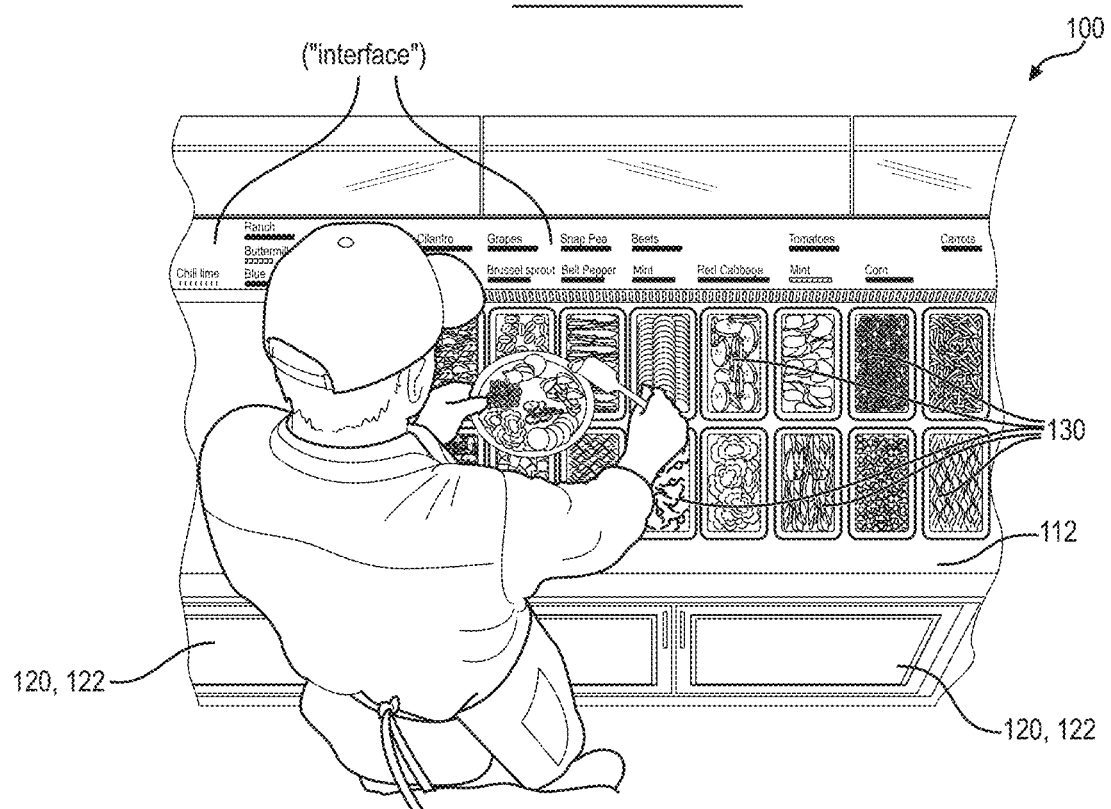
Figure 7:
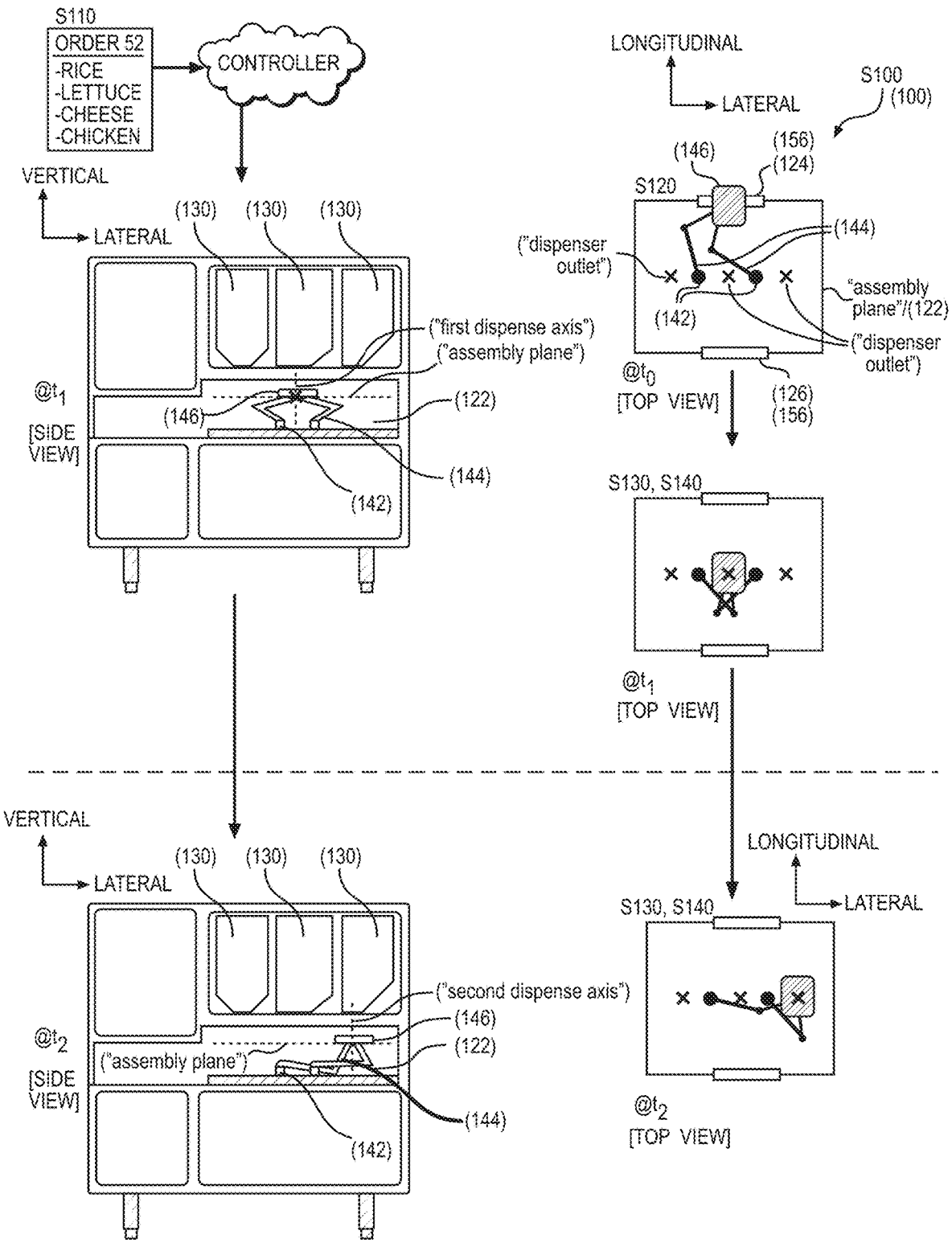
FIG. 7 is a flowchart representation of a method.
Figure 8:
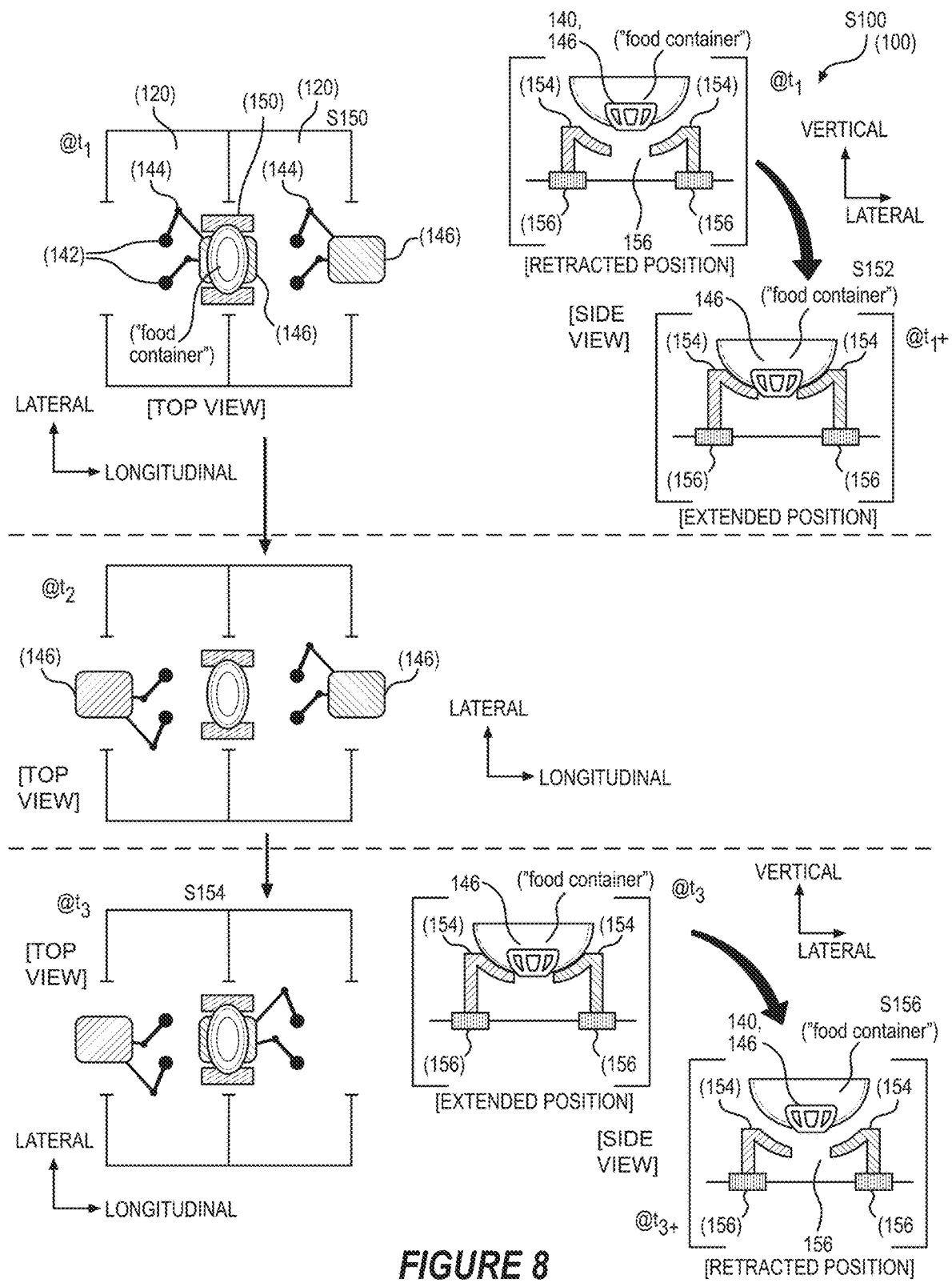
FIG. 8 is a flowchart representation of one variation of the method.

As shown in FIGS. 2, 7, and 8, a method S100 includes: receiving a food order for a unit of the food product type and specifying a set of ingredients in Block S110; and triggering a set of arm actuators 142, integrated within a first module housing 120, to rotate a set of positioner arms 144—mechanically coupled to the set of arm actuators 142—across an assembly plane to a receiving position within an autonomous assembly zone 122 of the first module housing 120 to receive a food container on a container platform 146 coupled to and supported by the set of positioner arms 144 in Block S120. The method S100 further includes, in response to the food order specifying a first ingredient, in the set of ingredients, stored in a first food-dispensing module 130, in a set of food-dispensing modules 130, transiently housed within the first module housing 120: triggering the set of arm actuators 142 to rotate the set of positioner arms 144 to move the container platform 146 across the assembly plane according to a first pathway to locate the food container in a first location beneath the first food-dispensing module 130 in Block S130; and triggering the first food-dispensing module 130 to dispense a first amount of the first ingredient into the food container at the first location in Block S140. The method S100 further includes, in response to the food order specifying a second ingredient, in the set of ingredients, stored in a second food-dispensing module 130, in the set of food-dispensing modules 130, transiently housed within the first module housing 120: triggering the set of arm actuators 142 to rotate the set of positioner arms 144 to move the container platform 146 across the assembly plane according to a second pathway to locate the food container in a second location beneath the second food-dispensing module 130 in Block S130; and triggering the second food-dispensing module 130 to dispense a second amount of the second ingredient into the food container at the second location in Block S140.

One variation of the method S100 further includes: triggering the first set of arm actuators to rotate the first set of positioner arms across the assembly plane to a handoff position within the autonomous assembly zone to transfer the food container from the first container platform to a second container platform supported by a second set of positioner arms mechanically coupled to a second set of arm actuators installed within a second module housing adjacent the first module housing in Block S150; and triggering the second set of arm actuators to rotate the second set of positioner arms across a second assembly plane of the second module housing to a second receiving position in Block S154. In this variation, the method S100 further includes, triggering a handoff assembly, arranged proximal the handoff position, to transfer the food container from the first container platform to the second container platform by: triggering an elevator actuator, of the handoff assembly, to drive an elevator from a retracted position to an extended position to locate the food container on the elevator platform and lift the food container from the first container platform in Block S152; and triggering the elevator actuator to drive the elevator from the extended position to the retracted position to seat the food container on the second container platform in Block S156.

3. Applications

Generally, the food production system 100 defines a reconfigurable make-line for on-demand food production and includes: a manual assembly zone 110 including a sequence of food hoppers configured to be loaded with ingredients and located along a food preparation surface 112 supporting manual construction of units of a food product by an operator (e.g., a worker and/or employee); and an autonomous assembly zone 122 arranged beneath the food preparation surface 112 and including a sequence of food-dispensing modules 130 configured to transiently (i.e., temporarily) install in the food production station, configured to store ingredients, and configured to dispense volumes or units of these ingredients to autonomously construct units of a food product. For example, the autonomous assembly zone 122 can be configured to autonomously assemble generic units of the same food type that are concurrently assembled and customized manually by a worker at the food preparation surface 112 above. Furthermore, the food production station can be assembled and reconfigured over time—such as by replacing food-dispensing modules 130 and/or rearranging module housings 120 in the sequence of module housings 120—to produce various types of food products, such as hot bowls (e.g., hot rice bowls), cold bowls (e.g., cold salads), smoothies, sandwiches, wraps, etc.

The food production system 100 can be configured for installation within a food-service establishment to augment manual food product assembly by an operator at the manual assembly zone 110 with autonomous food product assembly at the autonomous assembly zone 122, thereby enabling increased food order throughput of the food-service establishment. For example, the food production station can be configured to autonomously construct food orders submitted online (e.g., via remote patrons) within the autonomous assembly zone 122, while the operator manually prepares food orders submitted by on-site patrons at the manual assembly zone 110.

In particular, a sequence of module housings 120 (e.g., cabinets) can be aligned and connected to form a make line supporting manual and autonomous assembly of generic and/or customer food orders from many different ingredients stored in food-dispensing modules 130 transiently installed within these module housings 120. For example, a first module housing 120 within the make line can include both a container dispensing module and a positioner module 140; a last module housing 120 within the make line can include a positioner module 140 and an elevator module; and each module housing 120 therebetween can include a single positioner module 140 configured to pass a food container along the makeline from the container dispensing module to the elevator module for dispensation of ingredients—via the sequence of food-dispensing modules 130 loaded within these module housings 120—into the food container according to assemble a unit of the food product type according to a particular food order.

The food production system 100 can therefore include a sequence of positioner modules 140—arranged within the sequence of module housings 120—configured to convey a food container through each module housing 120, in the sequence of module housings 120, and selectively manipulate the food container beneath food-dispensing modules 130 loaded within these module housings 120 for dispensation of ingredients into the food container. In particular, each module housing 120 can include a positioner module 140 configured to receive a food container from a preceding positioner module 140—installed in a preceding module housing 120—and transfer (or "handoff") the food container to a subsequent positioner module 140 installed in a subsequent module housing 120 in the sequence of module housings 120.

A positioner module 140 within one module housing 120 can include: a container platform 146 configured to transiently receive and support a base of a food container (e.g., a "bowl"); and a set of rotatable positioner arms 144—coupled to the container platform 146 and flexibly mounted to a base surface of the module housing 120—configured to support and manipulate (i.e., translate and rotate in two degrees of freedom) the container platform 146 within the module housing 120 to locate the food container under one or more food-dispensing modules 130 installed within this module housing 120. In particular, the controller 160 can execute commands to rotate the set of positioner arms 144—via a set of arm actuators 142 installed within the module housing 120—at dissimilar speeds and orientations in order to: rotate the container platform 146 (e.g., 45 degrees, 90 degrees, 180 degrees)—loaded with the food container—over a range of positions and/or orientations within the module housing 120 (e.g., across an assembly plane arranged below the set of food-dispensing modules 130); sequentially locate target regions of the food container under one or more food-dispensing modules 130 within the module housing 120; concurrently or sequentially trigger these food-dispensing modules 130 to dispense ingredients (e.g., hot ingredients, cold ingredients, dry ingredients) into the food container to achieve a target (e.g., visually-appealing, visually-balanced, physically-balanced) ingredient plating for the food container; and thus achieve high food container through-put and accurate and repeatable plating of custom combinations of ingredients.

Furthermore, the positioner module 140 can include a set of arm actuators 142 configured to selectively drive the set of positioner arms 144 (e.g., a pair of actuators for a pair of positioner arms 144). For example, the positioner module 140 can include: a first arm actuator 142—mechanically coupled to a first positioner arm 144—configured to selectively drive the first positioner arm 144; and a second arm actuator 142—mechanically coupled to a second positioner arm 144—configured to selectively drive the second positioner arm 144. By independently driving the first and second positioner arms 144, the first and second arm actuator 142 can cooperate to drive the container platform 146—and therefore the food container-across a greater range of positions within the module housing 120, thereby enabling dispensation of ingredients into the food container to achieve a wider range of plating patterns, such as a radial plating pattern, a layered plating pattern, and/or a segmented plating pattern.

The container platform 146 and positioner arms 144 can therefore cooperate to enable accurate placement and plating of ingredients in a food container. For example, each positioner arm 144 can be configured to move 360 degrees within a horizontal plane (or the "assembly plane") and at any radius from the positioner arm actuators 142. Therefore, by including multiple positioner arms 144 (e.g., two positioner arms 144)—each defining two or more degrees of freedom—in the positioner module 140, the positioner module 140 can maneuver the container platform 146 along a wider range of pathways defining an increased number of positions and/or orientations of the food container within the autonomous assembly zone 122 (e.g., on the assembly plane) of the module housing 120. In particular, the positioner module 140 can maneuver the food container in several positions and pathways below the food-dispensing module 130 such that the food-dispensing module 130 can dispense an ingredient into a specific region of the food container. For example, the positioner module 140 can position the container platform 146 to locate a left-side region of the food container below an outlet of a first food-dispensing module 130, such that the first food-dispensing module 130 can dispense a portion of lettuce—stored in the first food-dispensing module 130—into the left-side region of the food container. The positioner module 140 can then position the container platform 146 to locate a right-side region of the food container below an outlet of a second food-dispensing module 130, such that the second food-dispensing module 130 can dispense a portion of rice—stored in the second food-dispensing module 130—into right-side region of the food container. The positioner module 140 can therefore achieve a particular plating pattern—such as a radial plating pattern, a layered plating pattern, a segmented plating pattern, etc.—defined for a food order assembled in the food container.

Furthermore, the positioner module 140 can be configured to receive and manipulate different shapes (e.g., round, oblong, square) and/or sizes of food containers for dispensation of ingredients into these food containers. In particular, by supporting the base of the food container, the container platform 146 can be configured to receive a food container of any shape and/or size (e.g., width, height). Additionally, in one implementation, the container platform 146 can define a surface profile configured to contour about the base of the food container—receive and support the base of the food container such that the base of the food container nests within the container platform 146—and thereby retain the food container (e.g., without tipping or slipping) on an upper surface of the container platform 146 during manipulation of the food container and/or dispensing of ingredients into the food container. Over time, the container platform 146 can be replaced with container platforms 146 exhibiting different surface profiles in order to accommodate food containers of various shapes and sizes.

Furthermore, components of the positioner module 140—including the set of positioner arms 144 and the container platform 146—can be configured to removably install within the module housing 120, such as via magnetic coupling or via gravity, such that these components may be rapidly installed and removed for cleaning, maintenance, and/or replacement with a different positioner module 140 (e.g., in a different configuration). In addition, the container platform 146 and set of positioner arms 144 can decouple (e.g., by disengaging drive splines of the set of arm actuators 142 and/or by disengaging a latch or magnetic coupling system) from the module housing 120 to allow an operator to access a bottom of the module housing 120 to wipe off any ingredients that may have spilled during operation. The positioner arms 144 decrease the mechanical complexity of the food production system 100 and reduce the number of small parts that require cleaning.

Therefore, the food production station can enable greater food order throughput, greater order customization, greater food order accuracy, rapid installation and/or removal of components for cleaning or maintenance, and both manual and automated food assembly within a single make line footprint. The food production station also includes a positioner module 140 configured to translate and rotate food containers—of different volumes—between food-dispensing modules 130 in order to achieve visual- and weighted-balance of ingredients loaded into these food containers.

4. Modular Food Production System

The food production system 100 can be configured to install within a food service establishment (e.g., a "fast-casual" restaurant, a ghost kitchen, a food court, a cafeteria) and can be assembled and reconfigured over time to produce various types of food product, such as smoothies, cold bowls (e.g., cold salads), hot bowls (e.g., hot rice bowls), cold sandwiches, hot sandwiches, cold wraps, hot wraps (e.g., burritos), pizzas, desserts, coffee products, etc.

Once a combination of food-dispensing modules 130 are assembled onto the food production system 100 to construct a particular type of food product, the food production system 100 can be loaded with a control program configured to: intake food orders from patrons; and to selectively actuate the food-dispensing modules 130 to construct instances of this food product according to these food orders.

The food production system 100 defines a base platform or "chassis" configured to support and locate a combination of food-dispensing modules 130 for fulfillment of food orders. In one implementation, the food production system 100 includes: a chassis (e.g., a rigid platform) defining a food preparation surface 112; and a cabinet—including a sequence of module housings 120—arranged beneath the food preparation surface 112 and configured to house a sequence of food-dispensing modules 130 for fulfillment of food orders; and a sequence of food containers (or "food hoppers")—transiently arranged within the sequence of module housings 120—configured to store ingredients for manual preparation of a food product type on the food preparation surface 112. For example, the food production system 100 can include: a steel box frame configured to support a sequence of food hoppers and food-dispensing modules 130; a food preparation surface 112 (e.g., a stainless steel surface) arranged over a top face of the steel box frame; and a set of legs (e.g., a set of round tubular legs) coupled to a bottom face opposite the top face of the steel box frame and configured to support the steel box frame.

The food production system 100 can include a sequence of food hoppers arranged along a back side of the food preparation surface 112 (e.g., opposite an employee working at the food production system 100) such that these food hoppers are arranged contiguously along a length of the food preparation surface 112 and ordered accordingly to efficiently and satisfactorily complete food orders. The food production system 100 can also include a cabinet: located beneath the food preparation surface 112 and within the steel box frame; including a sequence of module housings 120 configured to transiently house a sequence of food-dispensing modules 130 configured to selectively dispense food ingredients according to food orders received by the food production system 100.

For example, the food production station can include a sequence of module housings 120 including: a first module housing 120 configured to transiently house a first set of food-dispensing modules 130 loaded with hot ingredients (e.g., rice, vegetables, meats); a second module housing 120—arranged adjacent and coupled to the first module housing 120—configured to transiently house a second set of food-dispensing modules 130 loaded with cold ingredients (e.g., lettuce, cheese); and a third module housing 120—arranged adjacent and coupled to the second module housing 120 opposite the first module housing 120—configured to transiently house a third set of food-dispensing modules 130 loaded with liquid ingredients (e.g., sauces, creams, dressings). The food production system 100 can therefore be configured to pass a food container (e.g., via the positioner module 140) through the sequence of module housings 120—beneath the sequence of food-dispensing modules 130—to assemble a food product including hot, cold, and/or liquid ingredients.

The food production system 100 can define a particular height (e.g., a work height) such that an employee may comfortably stand facing a front side of the food production system 100 while handling food (e.g., adding ingredients to a serving container, preparing ingredients, refilling food hoppers) on the food preparation surface 112 and/or interfacing with a patron. For example, the food production system 100 can exhibit a height—between a ground surface and the food preparation surface 112—approximately (e.g., within two inches) between 35 inches and 42 inches. Furthermore, the bottom surface of the food production system 100 can be offset a ground surface (e.g., the floor) in order to enable cleaning beneath the food production system 100. For example, the food production system 100 can include the set of legs defining a particular height such that: an employee may clean the bottom surface of the food production system 100 and surfaces (e.g., the floor) below the food production system 100; the food preparation surface 112 sits within a working height range (e.g., between 36 and 38 inches); and the module housing 120, including a sequence of food-dispensing modules 130, fits between the bottom surface and the food preparation surface 112.

4.1 Manual Assembly Zone

The food production system 100 can include a manual assembly zone 110 including the food preparation surface 112 and a receptacle 114 configured to receive the sequence of food hoppers transiently located atop the food preparation surface 112 and configured to store ingredients for manual preparation of units of food products according to food orders submitted by patrons. As shown in FIGS. 2A and 2B, the manual assembly zone 110 can be configured such that an employee may stand facing a front side of the food production system 100—proximal the sequence of food hoppers—to handle ingredients and/or assemble food orders while a patron views and/or manually points at ingredients along a back side of the food production system 100.

4.2 Autonomous Assembly Zone

The food production system 100 can include an autonomous assembly zone 122 located below the food preparation surface 112 of the manual assembly zone 110. The autonomous assembly zone 122 includes: a sequence of module housings 120 configured to house a set of food-handling modules (e.g., food-dispensing modules 130, food processing modules); a positioner module 140 configured to move a food container along a length of the autonomous assembly zone 122 as the food container is filled with ingredients; and a controller 160 configured to receive food orders from patrons and selectively actuate the set of food-handling modules for dispensation of ingredients in order to complete these food orders. The autonomous assembly zone 122 can include a sequence of food hoppers configured to store ingredients corresponding to food orders. In one implementation, as described above, the sequence of food hoppers located along the manual assembly zone 110 are coupled to the module housing 120 of the autonomous assembly zone 122, such that the sequence of food hoppers can be configured to store ingredients for both the manual assembly zone 110 and the autonomous assembly zone 122.

The autonomous assembly zone 122 can define a basement defining a cavity for housing electronics including power supplies, actuators, drivers, and/or controllers 160. The basement can include a seal (e.g., caulk, weld, gasket, or silicone flange) configured to prevent ingredients, from the food-dispensing module 130 of the module housing 120 above, from entering the basement. In one implementation, the electronics in the basement mount to a single chassis such that the electronics can remove from the basement on a single chassis for maintenance and cleaning.

The food production system 100 can include as many module housings 120 as necessary for assembly of a meal. For example, a module housing 120 as described herein can include a manual assembly zone 110 (including a food preparation surface 112 and food hoppers) and an autonomous assembly zone 122 (including a module housing 120, positioner module 140, food-dispensing module 130, and controller 160). Each module housing 120 includes a food-dispensing module 130 that can dispense an ingredient or set of ingredients into a food container within the module housing 120. For example, a first module housing 120 can define a "base" module housing 120 that includes ingredients within the food hopper for meal "base" options such as rice, noodles, or salad. A second module housing 120 adjacent the first module housing 120 can define a "toppings" module housing 120 that includes food hoppers holding various topping ingredients. A third module housing 120 adjacent the second module housing 120 can define a "sauces" module housing 120 that includes food hoppers holding sauces for dispensing onto a meal. To assemble a meal, the positioner module 140 passes the food container from a first module housing 120 to a second module housing 120 to a third module housing 120 and the controller 160 triggers the food-dispensing modules 130 to dispense ingredients of the food order at each module housing 120, or an operator of the manual assembly zone 110 can access ingredients stored in the first, second, and third module housings 120 and add the ingredients to the food container.

4.3 Module Housing

Generally, the food production system 100 can include a sequence of module housings 120 (e.g., forming a makeline) supporting the food preparation surface 112—arranged at work surface height—and configured to transiently house food-production modules—such as including food-dispensing modules 130 and/or food-processing modules—for autonomous assembly of food orders of a food product type within the sequence of module housings 120 and/or manual assembly of food orders of the food product type at the food preparation surface 112.

Generally, the food production system 100 can include a quantity of food module housings 120—arranged in a particular order—corresponding to a quantity and/or type of ingredients required to assemble food orders at a particular dining establishment. The food production system 100 can therefore be configured to include a custom quantity of food module housings 120 tailored to types of ingredients and/or food orders offered at the particular dining establishment containing the food production system 100.

4.3.1 Module Housing+Window

In one implementation, each module housing 120 can include a window 129—arranged on a front surface of the module housing 120—configured to enable user access to an interior of the module housing 120. For example, the window 129 can define an opening arranged on the front surface of the module housing 120. Alternatively, in another example, the window 129 can define a panel (e.g., a transparent or opaque panel)—configured to oscillate between an open and closed position—arranged on the front surface of the module housing 120.

In particular, in this implementation, a module housing 120 can include a window 129: arranged on a front surface—such as facing an operator of the food production system 100—of the module housing 120; and arranged proximal the autonomous assembly zone 122 of the module housing 120. For example, the module housing 120 can include a window 129: arranged on the front side of the module housing 120; and arranged coaxial an inlet region intersecting the autonomous assembly zone 122, such that the inlet region extends between the window 129 and the autonomous assembly zone 122. An operator may therefore reach through the window 129 and inlet region to access the autonomous assembly zone 122, such as to clean surfaces within the autonomous assembly zone 122 and/or replace components (e.g., the positioner module 140, a drip tray) arranged within the autonomous assembly zone 122.

In one example, the window 129 can define an opening arranged on the front surface of the module housing 120 and be configured to receive a flexible tray 180 (e.g., a drip tray) configured to install within the autonomous assembly zone 122 below and/or about the positioner module 140. In this example, the window 129 can define a window height approximating and/or exceeding a tray height of the flexible tray 180 by a target difference, such that walls of the flexible tray 180—of the tray height—substantially span the opening when installed within the autonomous assembly zone 122, thereby preventing spills and/or food debris outward through the window 129 during actuation of the set of food-dispensing modules 130 and/or the positioner module 140.

Alternatively, in another example, the window 129—such as defining a hinged or sliding window—can be configured to: occupy a closed position during actuation of modules of the module housing 120 for assembly of food orders; and occupy an open position—responsive to manual opening of the window 129 by an operator—to enable operator access to the autonomous assembly zone 122, such as for cleaning of surfaces within and/or below the autonomous assembly zone 122 and/or for replacement and/or installation of components (e.g., a positioner module 140, a flexible tray 180) within the autonomous assembly zone 122.

4.3.2 Flexible Tray

In one implementation, the module housing 120 can further include a flexible tray 180: configured to transiently install within the autonomous assembly zone 122 below and/or about the positioner assembly; and configured to collect food debris, such as during dispensation of ingredients into the food container.

In this implementation, the autonomous assembly zone 122 can define a fixed height approximating and/or exceeding a combined height of the flexible tray 180, the set of positioner arms 144, the container platform 146, and the food container. Therefore, by minimizing a quantity of moving parts (e.g., such as required for a conveyor belt system) in the positioner module 140 and minimizing a vertical height of the positioner module 140—defined by the set of positioner arms 144 and the container platform 146—the module housing 120 can accommodate a tray height of the flexible tray 180 within the autonomous assembly zone 122. By including this flexible tray 180 within the autonomous assembly zone 122 during assembly of food products, the flexible tray 180 can limit an amount of food debris spilled or released (e.g., unintentionally) onto interior surfaces of the module housing 120 (e.g., other than the flexible tray 180), thereby reducing resources dedicated to cleaning these surfaces.

Furthermore, an operator may open and/or reach through the window 129—arranged on the front side of the module housing 120—to access the autonomous assembly zone 122 and therefore readily remove the flexible tray 180 for cleaning and/or to re-install the flexible tray 180 in preparation for assembly of units of the food product type.

For example, the module housing 120 includes: a set of positioner actuators arranged below the autonomous assembly zone 122 and defining a set of driveshafts extending into the autonomous assembly zone 122; a positioner module 140—arranged within the autonomous assembly zone 122—including a set of positioner arms 144 coupled to the set of driveshafts and a conveyor platform coupled to the set of positioner arms 144 opposite the set of driveshafts; and a flexible tray 180 (e.g., a drip tray) configured to transiently install below the positioner assembly within the autonomous assembly zone 122. In particular, the flexible tray 180 can define: a set of cutouts (e.g., one cutout, two cutouts) configured to nest over the set of driveshafts to locate the flexible tray 180 within the autonomous assembly zone 122; and a tray geometry—such as a shape and/or size—approximating a geometry of the autonomous assembly zone 122, such that the flexible tray 180 extends about the set of driveshafts and toward walls of the autonomous assembly zone 122, thereby forming a floor of the autonomous assembly zone 122. Additionally or alternatively, in one example, the flexible tray 180 can define a tray cross-sectional area exceeding a cross-sectional area of the autonomous assembly zone 122, such as edges of the flexible tray 180 extending upward against walls of the autonomous assembly zone 122.

In one example, at a start of an assembly period, an operator may: insert the flexible tray 180 through the window 129 and into the autonomous assembly zone 122; locate the set of cutouts over the set of driveshafts; insert the set of cutouts over the set of driveshafts to install the flexible tray 180 within the autonomous assembly zone 122; and couple the set of positioner arms 144—coupled to the container platform 146—to the set of driveshafts to mechanically couple the set of positioner arms 144 to the set of positioner actuators arranged below the autonomous assembly zone 122. Later, to remove the flexible tray 180 for cleaning, the operator may: reach through the window 129 to access the autonomous assembly zone 122 and decouple the positioner module 140 from the set of driveshafts; lift the flexible tray 180 upward over the set of driveshafts; and remove the flexible tray 180 for cleaning.

Alternatively, in another example, the flexible tray 180 can define a set of slits extending between an outer edge of the flexible tray 180 and the set of cutouts. In this example, rather than remove the positioner module 140 in order to install and/or remove the flexible tray 180, the operator may install the flexible tray 180 by threading the set of driveshafts through the set of slits to locate the set of driveshafts within the set of cutouts.

Additionally or alternatively, in one implementation, the flexible tray 180 can define a set of tray walls of a fixed tray height configured to substantially and/or partially cover interior walls of the autonomous assembly zone 122 to prevent spilling of food debris onto these interior walls. Furthermore, the set of tray walls can be configured to cover the window 129—such as defining an opening in the front side of the module housing 120—to prevent food spills outward from the autonomous assembly zone 122 via the window 129. In particular, in this implementation, the flexible tray 180 can define the set of tray walls of the fixed tray height approximating and/or less than—and within a threshold difference of—a window height of the window 129. The flexible tray 180—such as defining a rubber container or tub—can therefore fill and/or approximately span the window 129 when installed within the autonomous assembly zone 122. An operator may therefore remove the flexible tray 180 via the window 129 to enable access to the autonomous assembly zone 122 and/or to other components—such as including the positioner module 140—arranged within the autonomous assembly zone 122.

In one example, the food production system 100 can include a first module housing 120—defining an autonomous assembly zone 122 extending along a longitudinal assembly axis arranged below the food preparation surface 112—configured to transiently house: a first food-dispensing module 130—seated within the receptacle 114 (e.g., of the food preparation surface 112) extending toward the autonomous assembly zone 122 within the first module housing 120—configured to store and dispense units of a first ingredient toward the autonomous assembly zone 122; and a second food-dispensing module 130—seated within the receptacle 114 (e.g., of the food preparation surface 112) extending toward the autonomous assembly zone 122 within the first module housing 120—configured to store and dispense units of a second ingredient toward the autonomous assembly zone 122.

The first module housing 120 can further include a first positioner module 140 arranged within the autonomous assembly zone 122 and including a set of arm actuators 142—each arm actuator 142, in the set of arm actuators 142, defining a driveshaft, in a set of driveshafts, extending upward into the autonomous assembly zone 122 and configured to transiently engage a positioner arm 144, in a set of positioner arms 144 of the first positioner module 140, to locate the positioner arm 144 within the autonomous assembly zone 122—arranged beneath the assembly plane.

In this example, the first module housing 120 can further include a flexible tray 180 (e.g., a drip tray) configured to transiently install below the first food-dispensing module 130 and the second food-dispensing module 130, below the container platform 146, and about the set of driveshafts within the autonomous assembly zone 122 to collect food debris. Additionally, the first module housing 120 can define a window 129 (e.g., an opening, a hinged or sliding window) integrated into a front surface of the first module housing 120—facing an operator—configured to enable removal of the first flexible tray 180 for cleaning and installation of the flexible tray 180 for collecting food debris during assembly of units of the food product type.

Furthermore, the flexible tray 180, the set of positioner arms 144, the container platform 146, and the food container can cooperate to define a first height less than a fixed height of the autonomous assembly zone 122 arranged below the food preparation surface 112 at the work surface height, while enabling location of a rim of the food container below outlets of the set of food-dispensing modules 130 by at least a minimum distance—and less than a maximum distance—for accurate dispensation of ingredients into the food container with minimal food spillage from the food container and onto surfaces of the module housing 120.

4.3.3 Food-Dispensing Modules

The food production system 100 also includes a sequence of food-dispensing modules 130, each food-dispensing module 130 (e.g., automatic dispenser) configured to transiently install within a module housing 120 and configured to dispense an amount (e.g., a volume, a mass, a number of units) of an ingredient toward the autonomous assembly zone 122 (e.g., into a food container supported by the positioner module 140).

Generally, the food production system 100 includes a population of food-dispensing modules 130 configured to: transiently install within a particular module housing 120 to dispense ingredients responsive to control inputs received from controllers 160 in the autonomous assembly zone 122; and to then be removed from the module housing 120 for cleaning, replacement with other food-dispensing modules 130, and/or reloading with ingredients before redeployment. For example, a worker may rapidly and easily remove (e.g., without any tools) a food-dispensing module 130 from the food production system 100 for cleaning, reload the food-dispensing module 130 with a particular ingredient, and replace the food-dispensing module 130 within the food production system 100.

In one implementation, the sequence of food-dispensing modules 130 can include: frozen-food-dispensing modules 130 configured to dispense metered volumes or mass units of ice, frozen fruits, and frozen vegetables; refrigerated-food-dispensing modules 130 configured to dispense metered volumes or mass units of fresh ingredients (e.g., fruits, vegetables, meats, dairy products); warm-food-dispensing modules 130 configured to dispense metered volumes or mass units of warm prepared ingredients (e.g., vegetables, meats, rice, noodles); and dry-food-dispensing modules 130 configured to dispense metered volumes or mass units of ambient-temperature ingredients (e.g., granola, nuts, seeds, dried fruit).

Additionally or alternatively, in another implementation, the food-dispensing modules 130 can include liquid dispensing modules configured to dispense metered volumes of liquid, such as juice, water, and low-viscosity (or "thin") sauces. In a similar implementation, the food production system 100 includes food paste dispensing modules configured to dispense metered volumes of gels and higher-viscosity liquids, such as butters, yogurt, and thick sauces (e.g., dressings). For example, the food production system 100 can include liquid dispensing modules including: a liquid container loaded with a volume of the liquid; and an automatic dispenser, coupled to the liquid container, and configured to dispense metered amounts of the liquid into food containers arranged on the positioner module 140—below the automatic dispenser—for assembling food orders including this liquid. In this example, the liquid dispensing module can be configured to: dispense a metered amount of the liquid directly into a food container loaded with other ingredients for assembling a particular food order; and/or dispense a metered amount of the liquid into a secondary food container (e.g., within the food container or presented "on the side") served with the food container to a patron associated with the particular food order.

Additionally or alternatively, in yet another implementation, the food production system 100 includes slicing-type dispensing modules configured: to be loaded with whole (or nearly-whole) units of ingredients, such as lettuce, onion, tomato, kiwi, or apple; to slice stored ingredients when triggered by the controller 160; and to dispense ingredient slices. Additionally or alternatively, in yet another implementation, the food production system 100 includes powder food-dispensing modules 130 configured to dispense metered volumes or mass units of powdered goods, such as salt, sugar, spices, or seeds.

Generally, the food production system 100 can include any combination of these types of food-dispensing modules 130.

4.3.3.1 Food Dispensing-Modules: Manual & Autonomous Food Assembly

In one implementation, the module housing 120 can be configured to transiently house a food-dispensing module 130 configured to store ingredients—for both manual and autonomous food assembly—and (automatically) dispense ingredients toward the autonomous assembly zone 122 (e.g., into a food container).

In particular, in this implementation, the food production system 100 can include: the food preparation surface 112 at work surface height and defining a receptacle 114 defining a set of slots configured to transiently receive a set of food-dispensing modules 130 configured to store and dispense ingredients for preparation of units of a food product type; a first module housing 120, in a sequence of module housings 120 (e.g., forming a makeline), supporting the food preparation surface 112 and defining an autonomous assembly zone 122 extending along the longitudinal assembly axis arranged below the food preparation surface 112; and a positioner module 140 arranged within the autonomous assembly zone 122 and configured to support and selectively move a food container below the set of food-dispensing modules 130.

The module housing 120 can be configured to transiently house a first food-dispensing module 130 in the set of food-dispensing modules 130: defining a first rim configured to seat within a first slot, in a set of slots, of the receptacle 114; and defining a first base-extending from the first rim and toward the autonomous assembly zone 122—configured to seat within the first module housing 120 below the food preparation surface 112 and above the first positioner module 140 and configured to store and dispense units of the first ingredient toward the autonomous assembly zone 122. An operator may therefore manually assemble a first unit of a food product—specifying the first ingredient—by reaching into the first food-dispensing module 130 from above the food preparation surface 112 (e.g., via the receptacle 114) to collect units of the first ingredient. Furthermore, the first food-dispensing module 130 can automatically—such as responsive to a command from the controller 160—dispense units of the first ingredient into a food container arranged on the positioner module 140 within the autonomous assembly zone 122 for autonomous assembly of a second unit of the food product specifying the first ingredient.

The module housing 120 can also be configured to transiently house a second food-dispensing module 130 in the set of food-dispensing modules 130: defining a second rim configured to seat within a second slot, in the set of slots, of the receptacle 114; and defining a second base—extending from the second rim and toward the autonomous assembly zone 122—configured to seat within the first module housing 120 below the food preparation surface 112 and above the first positioner module 140 and configured to store and dispense units of the second ingredient toward the autonomous assembly zone 122. Additionally, the module housing 120 can similarly be configured to house a third food-dispensing module 130 configured to store and dispense units of a third ingredient toward the autonomous assembly zone 122, the third food-dispensing module 130 seated within a third slot, in the set of slots, of the receptacle 114 extending toward the autonomous assembly zone 122 within the first module housing 120. The module housing 120 can similarly be configured to house a fourth food-dispensing module 130, a fifth food-dispensing module 130, a sixth food-dispensing module 130, etc.

4.4 Food Containers

In one variation, a first instance of the food production system 100 includes a sequence of container dispensing modules 125 configured to house food containers of different depths (e.g., 2.0" to 5.0") but common diameters and, therefore, different volumes (e.g., small, medium, large volumes).

For example, the sequence of container dispensing modules 125 can include: a first container dispensing module 125 configured to dispense containers of a first size (e.g., medium) with a first depth (e.g., 4.0") and configured for loading with ingredients of a first food product (e.g., cold food bowls, such as for an acai food order); a second container dispensing module 125 configured to dispense containers of a second size (e.g., large) with a second depth (e.g., 5.0") and configured for loading with ingredients of a second food product (e.g., hot food bowls, such as for a Chicken Cesar Salad food order); a third container dispensing module 125 configured to dispense containers of the first size and configured for loading with module housings 120 of a second food product (e.g., hot food bowls); a fourth container dispensing module 125 configured to dispense containers of the second size and configured for loading with module housing 120 of the second food product; and a fifth container dispensing module 125 configured to dispense containers of a third size (e.g., small) and configured for loading with volumes of sauces, dressings, and/or dips.

Therefore, the food production system 100 can be configured to load, fill, and output container dispensing modules 125 characterized by a range of sizes and/or depths and can locate these food containers on positioner module 140 before reaching output ports of the food-dispensing modules 130 without physical change or reconfiguration of the set of conveyor belts, the food-dispensing modules 130, or container dispensing modules 125 within the food production system 100.

The food production system 100 can store, load, and output food containers outcome score various sizes and/or shapes, such as including round, oblong (e.g., elliptical, oval), and/or rectangular food containers (or "bowls"). For example, the food production system 100 can support elliptical food containers with a 4-6 in minor axis diameter, a 6-12 in major axis diameter, and a depth of 2-5 in. The food production system 100 can be configured to accept (e.g., the positioner module 140 can maneuver) food containers made of ceramic, metal, cardboard, plastic, paper, glass, polystyrene foam, biodegradable materials, or any other material suitable for holding food.

4.5 Computer System

The computer system (e.g., remote server, computing device) can receive non-optical and/or optical data from the controller 160 and/or one or more sensors 170 installed in the food production system 100 and can manipulate these data to: track and display errors to an employee; update order fulfillment data; and/or to update fill status of food-dispensing modules 130 in the food production system 100. Furthermore, the computer system can generate predictions and target locations—executed by the controller 160—to minimize ordering excess ingredients (e.g., due to wasted ingredients, due to overfilling food orders, due to incorrect food orders), to balance the weight of ingredients in each food container during assembly, and to achieve a particular visual presentation of ingredients within each food container based on these data.

In one variation, the computer system can generate predictions for a likelihood of an order containing a series of ingredients for dispensation. Additionally or alternatively, the computer system can generate target locations for ingredient dispensation, based on historical data of food orders—assembled at the food establishment within a time period (e.g., one day, one week, one month)—from an ordering system, to balance the weight of ingredients in each food container during assembly.

For example, the computer system can: access a list of menu items-labeled with recipes containing ingredients, weights of ingredients, and rotation angles—and extract data during a particular day of the week (e.g., Friday) in which the food establishment fulfilled an approximate amount of food orders (e.g., 32 orders) for a first menu item, from the list of menu items. Then, the computer system can generate a prediction for an amount of a first ingredient to fulfill the approximate amount of food orders for the next occurrence of the particular day of the week, thereby minimizing excess ingredients ordered by an employee of the food establishment (e.g., due to wasted ingredients, due to overfilling food orders, due to incorrect food orders). Furthermore, the computer system can generate target locations for dispensation of the first ingredient—executed locally by the controller 160—into a food container on a container platform 146 in order to balance the weight of the first ingredient in the food container and to achieve a particular presentation of the first ingredient in the food container.

Accordingly, the computer system can implement and repeat these methods and techniques for: each other ingredient of each other menu item; each other food container; and each other particular day of the week to generate predictions for an amount of each ingredient to fulfill the approximate amount of food orders for the next occurrence of the particular day of the week and to generate target locations for dispensation of each ingredient.

Therefore, the computer system can generate predictions and target locations—executed locally by the controller 160—to help eliminate food waste and cost, to balance the weight of ingredients in each food container during assembly, and to achieve a particular visual presentation of ingredients within each food container.

4.6 Controller

The food production system 100 includes a controller 160 configured to intake food orders from patrons and to selectively actuate the positioner module 140 and food-dispensing modules 130 to construct instances of a food product according to these food orders. More specifically, the autonomous assembly zone 122 can include an integrated controller 160 configured to: receive or access orders submitted by patrons via a user interface (e.g., arranged on a customer-facing façade of the food production system 100, arranged within a food establishment such as a ghost kitchen, or within a native food ordering application executing on a user's mobile computing device) and/or via direct interaction with an employee; and handle autonomous fulfillment of these orders by triggering actuation of food dispensing and processing modules in the food production system 100, such as via the historical data described below. Furthermore, the controller 160 can be configured to locally actuate the components of the positioner module 140 to advance and manipulate food containers to receive dispensation of ingredients from food-dispensing modules 130 within the food production system 100.

Furthermore, the controller 160 can receive signals from a set of sensors 170 installed within the manual assembly zone 110 and/or autonomous assembly zone 122 of the food production system 100 For example, the controller 160 can track load cell readings throughout multiple module housings 120 to track an increase in mass of a food container overtime and validate that ingredients dispensed from food-dispensing modules 130 entered the food container. The controller 160 can additionally record, store, and manipulate data received from the set of sensors 170 to derive timeseries of sensor 170 data. The controller 160 can additionally detect error instances based on data captured by the set of sensors 170. For example, if the controller 160 receives a mass reading for a food container from a load cell that is above an expected value (e.g., a pre-programmed value or a value extrapolated from past system data), the controller 160 can trigger the positioner module 140 supporting the food container to automatically stop movement to avoid tipping.

The autonomous assembly zone 122 can also include a wireless communication module coupled to the controller 160 and configured to: receive food orders for patrons; communicate errors, order fulfillment data, and/or fill status of food-dispensing modules 130 in the food production system 100 to a computer system (e.g., remote server); and receive control-related updates executable by the controller 160 when processing food orders. Alternatively, the controller 160 and wireless communication module (and/or other controls- and communications-related subsystems) can be arranged in a controls module configured to transiently install in a food production system 100.

In one variation, food-dispensing modules 130 include a sub-controller 160 configured to locally control dispensation of metered volumes of an ingredient contained in this food-dispensing module 130—such as by implementing closed-loop controls to drive actuators in the food-dispensing module 130 based on outputs of various sensors 170 integrated into the food-dispensing module 130—responsive to receipt of a command from the controller 160 to dispense this amount of the ingredient.

4.7 Sensors

The food production system 100 can include a set of sensors 170 coupled to the sequence of food hoppers located on the food preparation surface 112 of the manual assembly zone 110 and the sequence of food-dispensing modules 130 of the autonomous assembly zone 122. The set of sensors 170 can be configured to record temperatures of ingredients contained in the sequence of food hoppers and/or the sequence of food-dispensing modules 130 (e.g., coextensive or separated the sequence of food hoppers) to monitor food quality and food safety of these ingredients over time. Furthermore, the set of sensors 170 can be configured to record ingredient levels of ingredients (e.g., weight in ounces, volume of a food hopper filled, percentage of the food hopper filled, quantity of servings remaining) stored within the food production system 100 (e.g., in the sequence of food hoppers and/or food-dispensing modules 130), the ingredient level corresponding to an amount remaining of a particular ingredient loaded in a food hopper and/or food-dispensing module 130 within the food production system 100.

4.7.1 Level Sensors

For example, the food production system 100 can include a first food-dispensing module 130 extending downward from the food preparation surface 112 of the manual assembly zone 110 into the autonomous assembly zone 122. The first food-dispensing module 130 can include: a food hopper configured to supply units of a first ingredient for manual preparation of units of a food product type in the manual assembly zone 110 and autonomous preparation of units of the food product type in the autonomous assembly zone 122; and an automatic dispenser coupled to the food hopper and configured to selectively dispense units of the first ingredient according to food orders received from patrons (e.g., via the controller 160).

In this example, the food hopper can include: a manual side arranged proximal the food preparation surface 112 and configured to transiently store ingredients for manual preparation of units of the food product type; and an autonomous side arranged proximal the automatic dispenser, below the manual side, and configured to transiently store ingredients for autonomous preparation of units of the food product type. The food production system 100 can include: a first level sensor 170 (e.g., a depth sensor 170) coupled to the manual side of the food hopper and configured to record a first remaining amount (e.g., by weight, by fill level, by volume percentage) of the first ingredient within the manual side; a second level sensor 170 coupled to the autonomous side of the food hopper and configured to record a second remaining amount of the first ingredient within the autonomous side; and a temperature sensor 170 coupled to the food hopper and configured to record a temperature (e.g., an average or representative temperature) of units of the first ingredient stored within the food hopper.

4.7.2 Optical Sensors

Furthermore, the autonomous assembly zone 122 can include a set of optical sensors 170 for process monitoring of food containers as each food container receives ingredients during assembly. Then, the computer system can receive images from the second set of optical sensors 170 and track each food container during assembly. For example, each housing module can include an optical sensor 170 and/or depth sensor 170 proximal each of the inlet and outlet handoff windows 156 to detect that ingredients were dispensed into the food container within a module housing 120, such as by comparing a first image captured at a previous handoff window 156 of the food production system 100 to a second image from a current handoff window 156 and detecting pixel value differences. In one implementation, the depth sensor 170 can capture depth readings indicating the height of the food in the food container. For example, the controller 160 can detect if an ingredient was dispensed in a module housing 120 or if the food height is over a threshold height and therefore will not fit through the handoff window 156 based on the depth readings.

4.7.3 Weight Sensors

In one implementation, the set of sensors 170 can further include a set of weight sensors 170 (e.g., load cells) integrated into the sequence of positioner modules 140. Each weight sensor 170, in the set of weight sensors 170, can be configured to output a signal representing weights of food containers carried by the positioner module 140. For example, the positioner module 140 can include: a container platform 146 configured to receive and support a food container; a set of positioner arms 144 (e.g., robotic arms) configured to move and/or rotate the container platform 146 to selectively locate the food container beneath food-dispensing modules 130 within a module housing 120 loaded with the positioner module 140; and a weight sensor 170 coupled to and/or integrated into the container platform 146 and configured to output a signal corresponding to a weight of the food container carried by the container platform 146. The controller 160 can monitor the output of a series of weight sensors 170 installed across each positioner module 140 in each module housing 120 to track weights of food containers in each module housing 120 during food assembly.

Additionally or alternatively, each weight sensor 170 can be configured to output a signal indicating a center of mass of the food container on the container platform 146. In particular, in one example, the positioner module 140 includes a load cell integrated into the container platform 146 and configured to output a signal representing a center of mass of the container platform 146 or a combination of the container platform 146, a food container on the container platform 146, and any ingredients in the food container.

In one implementation, the food production system 100 includes a first module housing 120 including a first positioner module 140, arranged within the autonomous assembly zone 122, and a weight sensor 170—configured to output signals representing timeseries weights of the food container (and/or weights of ingredients loaded in the food container) on the container platform 146. In this implementation, the controller 160 can interpret amounts of ingredients dispensed by the set of food-dispensing modules 130 into the food container on the container platform 146 based on signals output by the weight sensor 170.

4.7.4 Positional Sensors

Additionally or alternatively, in another implementation, the set of sensors 170 can include a set of positional sensors 170 configured to output signals representing positions (e.g., longitudinal and/or lateral positions, orientations) of components of a positioner module 140 installed within a module housing 120. For example, a positioner module 140—installed within a module housing 120 of the food production system 100—can include: a container platform 146 configured to receive and support a food container; a first and second positioner arm 144 configured to cooperate to move and/or rotate the container platform 146 to selectively locate the food container beneath food-dispensing modules 130 within the module housing 120; a first magnetic encoder coupled to the first positioner arm 144 and configured to output a signal representing a position and/or orientation (e.g., from a baseline orientation) of the first positioner arm 144 within the module housing 120; a second magnetic encoder coupled to the second positioner arm 144 and configured to output a signal representing a position and/or orientation of the second positioner arm 144 within the module housing 120; and/or a third magnetic encoder coupled to the container platform 146 and configured to output a signal representing a position and/or orientation of the container platform 146 within the module housing 120. The controller 160 can then: read these signals output by the set of positional sensors 170; and interpret positions and/or orientations of components of the positioner module 140—and therefore of a food container loaded on the container platform 146—accordingly.

5. Positioner Module

The food production system 100 can further include a positioner module 140 configured to install within the autonomous assembly zone 122 and to move a food container along a sequence of food dispensing and/or processing modules as the food container is filled with ingredients according to a food order received from a patron.

In one implementation, a positioner module 140—installed within a module housing 120—includes: a container platform 146 configured to receive and support a base (or "bottom surface") of a food container; and a set of (e.g., two) positioner arms 144—flexibly coupled to the container platform 146 and a base of the module housing 120—cooperating to support and maneuver the container platform 146 beneath one or more food-dispensing modules 130 installed within the module housing 120.

In particular, the set of positioner arms 144 can be configured to: constrain the container platform 146 at a target height offset a base (e.g., ingredient outlets) of the set of food-dispensing modules 130—arranged within the module housing 120—by more than a maximum food container height (e.g., six inches); and cooperate to translate and rotate the food container under one or more food-dispensing modules 130 for dispensation of ingredients—such as in a particular order and/or in a particular region of the food container—into the food container. Furthermore, the food production system 100 can include a set of arm actuators 142 configured to mechanically couple to the set of positioner arms 144 and thereby selectively drive the set of positioner arms 144 according to commands received from the controller 160.

Generally, each module housing 120 of the sequence of module housings 120 includes a positioner module 140 of the sequence of positioner modules 140. For example, the sequence of positioner modules 140 can include: a first positioner module 140 transiently installed within a first module housing 120; a second positioner module 140 transiently installed within a second module housing 120; and a third positioner module 140 transiently installed within a third module housing 120. Therefore, each module housing 120 includes a positioner module 140 configured to receive a food container from an adjacent module housing 120, position the food container beneath a food-dispensing module 130 of the module housing 120, and pass the food container (e.g., via a container handoff) through a handoff window 156 to a second adjacent module housing 120 to assemble a unit of a food product type.

5.1 Container Platform

The positioner module 140 can include a container platform 146 configured to receive and support the food container. In particular, the container platform 146 can define: an upper surface configured to transiently receive the food container, such that a base of the food container seats on the upper surface; and a lower surface-opposite the upper surface—defining a set of coupling features configured to couple to the set of positioner arms 144.

Generally, the container platform 146 can be configured to stabilize the food container on the upper surface of the container platform 146, and therefore reduce risk of tipping and/or slipping of the food container from the container platform 146 during operation. In one implementation, the container platform 146 defines an upper surface configured to conform to a profile of a base of the food container. In particular, the upper surface of the container platform 146 can define a platform profile corresponding to a base profile of the base of the food container, such that the base of the food container approximately nests within the upper surface of the container platform 146. The container platform 146 can therefore be configured to maximize a contact surface area between the upper surface of the container platform 146 and the base of the food container while extending about a portion of a side (e.g., side walls) of the food container. For example, the upper surface of the container platform 146 can include a rigid material formed to match a profile of the bottom of a food container or a deformable material into which gravity causes the bottom of the food container to nest into the container platform 146.

Furthermore, the positioner module 140 can include different units of the container platform 146 over time in order to accommodate food containers of various shapes and/or sizes. In particular, during a first food assembly period, the positioner module 140 can include a first container platform 146—defining a first upper surface of a first size and defining a first surface profile—configured to receive and support food containers of a first container size and a first base profile (e.g., round). Then, during a second food assembly period, the positioner module 140 can include a second container platform 146—defining a second upper surface of a second size and defining a second surface profile—configured to receive and support food containers of a second container size and a second base profile (e.g., oblong).

In one example, the food production system 100 includes a container-dispensing module 190 configured to store and dispense food containers (e.g., as described above). The food production system 100 further includes a first module housing 120: defining an autonomous assembly zone 122 extending along the longitudinal assembly axis arranged below the food preparation surface 112; configured to transiently house a set of food-dispensing modules 130; and including a positioner module 140 arranged within the autonomous assembly zone 122. In this example, during a first time period, the positioner module 140 can include a first container platform 146: transiently coupled to a set of positioner arms 144, of the positioner module 140, during the first time period; defining a first upper surface of a first surface profile corresponding to a first container profile of food containers loaded in the container-dispensing module 190 during the first time period; and configured to transiently receive and retain food containers of the first container profile on the first upper surface. Additionally, during a second time period, the positioner module 140 can include a second container platform 146: transiently coupled to the set of positioner arms 144 during the second time period; defining a second upper surface of a second surface profile corresponding to a second container profile of food containers loaded in the container-dispensing module 190 during the second time period; and configured to transiently receive and retain food containers of the second container profile on the second upper surface.

In this example, an operator may interchange a container platform 146 to adapt the food production system 100 to maneuver a food container of a different shape. In particular, in one example, a first container platform 146 configured to support and conform to the bottom of an oblong bowl can detach from the positioner arms 144 and be replaced by an operator with a second container platform 146 configured to support and conform to the bottom of a round bowl. The operator may de-couple the container platform 146 from the positioner arms 144 such as by pulling a magnetically coupled container platform 146 away from the positioner arms 144, unscrewing the container platform 146 from the positioner arms 144, or pressing a button to disengage a latch between the container platform 146 and positioner arms 144.

Additionally or alternatively, in another implementation, the container platform 146 can define a set of walls extending upward from the platform surface and configured to retain the food container on the container platform 146. In particular, the upper surface of the container platform 146 defines a bottom plane with two sides that extend upward to support the food container from the bottom and two sides. For example, the upper surface of the container platform 146 can define a 4 inch by 6 inch base with a 2 inch by 4 inch wall extending in the z axis direction on both 4 inch sides of the container platform 146. Therefore, the 2 inch extended walls provide a vertical surface for the walls of the food container to rest against to prevent slippage of the food container.

In one implementation, the container platform 146 defines a cavity—defining a particular depth—within which the food container nests. In this example, the food container can settle into the cavity of the container platform 146, thereby reducing the risk of the food container falling from the container platform 146 during assembly of the meal.

Additionally or alternatively, in yet another implementation, the container platform 146 can be formed of a high friction material or otherwise textured material configured to increase friction between the container platform 146 and the food container. For example, the upper surface of the container platform 146 can include a ribbed silicone layer configured to grip the bottom of the food container. Therefore, by increasing friction between the container platform 146 and the food container, incidence of slipping of the food container is reduced.

Furthermore, in one variation, the container platform 146 can include a spring-loaded mechanism configured to clamp the food container against the upper surface of the container platform 146 and therefore retain the food container on the container platform 146. Additionally or alternatively, in another variation, the container platform 146 can be formed of an elastic or otherwise malleable material that conforms to a base surface of the food container to flexibly retain food containers of various shapes and/or base profiles against the upper surface and on the container platform 146.

5.2 Positioner Arms

The positioner module 140 can include a set of positioner arms 144 flexibly mounted to a base surface of the module housing 120 and configured to: support and locate the container platform 146 at the target height (e.g., below the food-dispensing modules 130); and cooperate to selectively translate and/or rotate the container platform 146—and therefore a food container seated on the container platform 146—within the module housing 120 and beneath the set of food-dispensing modules 130.

Each positioner arm 144, in the set of positioner arms 144, can define: an upper arm section coupled to the lower surface of the container platform 146; and a lower arm section flexibly coupled to the upper arm section and coupled to a base surface of the module housing 120. For example, a positioner arm 144 can define a jointed arm defining an upper arm section coupled to the container platform 146 and a lower arm section pivotably coupled to the upper arm section and pivotably coupled to the base surface.

In one implementation, the positioner module 140 includes a first positioner arm 144 and a second positioner arm 144. The first positioner arm 144 can include: a lower arm section defining a first end pivotally coupled to a first mounting feature on the base surface of the module housing 120 (e.g., mounted to an actuator) and a second end opposite the first end; and an upper arm section defining a third end pivotally coupled to the second end of the lower arm section and a fourth end—opposite the third end—pivotally coupled to the lower surface of the container platform 146 at a pivot point. The lower arm section can therefore pivot about the first mounting feature on the base surface to rotate the second end of the first lower arm section—and therefore the first upper arm section coupled to the second end—about a first vertical axis coaxial the first mounting feature. The upper arm section can pivot about the second end of the lower arm section to rotate the fourth end of the upper arm section about a second vertical axis coaxial the second end of the lower arm section and parallel the first vertical axis. Therefore, the upper and lower arm sections can pivot independently of one another, thereby increasing a range of pathways defined for the container platform 146 and/or a food container loaded on the container platform 146.

Furthermore, in this implementation, the second positioner arm 144 can similarly include a lower arm section defining: a first end pivotally coupled to a second mounting feature on the base surface of the module housing 120 (e.g., mounted to an actuator); and a second end opposite the first end. The second positioner arm 144 can include an upper arm section defining: a third end pivotally coupled to the second end of the lower arm section and a fourth end—opposite the third end—rigidly fixed to the lower surface of the container platform 146 at the pivot point. Therefore, the first positioner arm 144 and the second conveyor can couple to the lower surface of the container platform 146 at the pivot point. However, the first positioner arm 144 can be configured to pivotably couple to the container platform 146 at the pivot point while the second positioner arm 144 can be configured to rigidly couple to the container platform 146 at the pivot point, thereby enabling the set of positioner arms 144 to support and maneuver the container platform 146 via pivoting of the upper and lower arm sections of each positioner arm 144, and control an orientation of the container platform 146 via actuation of the second positioner arm 144.

In this implementation, a first arm actuator 142 and a second arm actuator 142 actuate the first positioner arm 144 and the second positioner arm 144 respectively. Electronics in the basement of the autonomous assembly zone 122 power and drive the first arm actuator 142 and the second arm actuator 142 of the first and second positioner arms 144. The controller 160 can then separately actuate the first arm actuator 142 and the second arm actuator 142. By separately actuating the first and second positioner arms 144, the positioner module 140 enables the set of positioner arms 144 to swivel a full 360-degrees within the module housing 120 (e.g., without returning to a home position). In one implementation, a joint of the first positioner arm 144 is configured to pass over a joint of the second positioner arm 144 without collision of the first and second positioner arm 144, thereby enable a greater range of pathways (e.g., ranges of motion, sets of positions) along which the set of positioner arms 144 traverse.

The set of positioner arms 144 can be configured to removably install within the module housing 120, such that a user may rapidly install and/or remove one or more positioner arms 144 from the module housing 120 for maintenance and/or cleaning of the positioner module 140 and/or module housing 120. In particular, the base surface of the module housing 120 can define a set of mounting features configured to engage corresponding features of the lower arm sections of the set of positioner arms 144 to retain the set of positioner arms 144 within the module housing 120. In one implementation, the set of positioner arms 144 can engage the set of mounting features to mechanically couple to a set of arm actuators 142 configured to drive the set of positioner arms 144 during operation. In particular, each positioner arm 144, in the set of positioner arms 144, can be configured to engage a particular mounting feature, in the set of mounting features, to mechanically couple to a corresponding actuator. Therefore, the module housing 120 can include a set of arm actuators 142—each arm actuator 142 configured to mechanically couple to a particular positioner arm 144 in the set of positioner arms 144—configured to independently drive the set of positioner arms 144 to selectively translate and/or rotate the food container beneath the set of food-dispensing modules 130.

For example, the module housing 120 can include a first arm actuator 142 configured to couple to a first positioner arm 144 and a second arm actuator 142 configured to couple to a second positioner arm 144. The first and second arm actuators 142 can include keyed or splined couplers to connect to the first and second positioner arms 144. The keyed or splined couplers maintain the position of the first and second positioner arm 144 on the first and second arm actuators 142, such that the positioner arms 144 do not move independently of the arm actuators 142. The couplers can additionally include latches or magnets configured to transiently engage the positioner arms 144 to retain the positioner arms 144 in a loaded position within the module housing 120.

5.2.1 Example: Jointed Positioner Arm

In one example, each positioner arm 144, in the set of positioner arms 144, can be actuated with two degrees of freedom. In this example, each positioner arm 144 can include a joint (e.g., defining a pivot point) at which the upper arm and the lower arm are pivotably coupled. The additional degree of freedom of the positioner arm 144 from the joint allows the positioner arm 144 to maneuver throughout the module housing 120 to a higher number of possible positions. For example, a positioner arm 144 with a single degree of freedom (e.g., no joint) can only rotate around the point of actuation (e.g., the arm actuator 142 to which the positioner arm 144 is coupled) at a radius defined by the length of the positioner arm 144. A positioner arm 144 with a joint can bend at the joint to change the radius between the container platform 146 at a distal end of the positioner arm 144 and the arm actuator 142 at the proximal end of the positioner arm 144. For example, a positioner arm 144 can include a first section of the positioner arm 144 with a length of L, and a second section of the positioner arm 144 with a length of L, and a joint arranged between the first and second section that enables the positioner arm 144 to bend at the joint. When the positioner arm 144 is fully extended (e.g., 180 degrees between first and second section), the container platform 146 at the end of the positioner arm 144 can be maneuvered radially about the arm actuator 142 at a distance of 2 L from the arm actuator 142. The joint of the positioner arm 144 can bend at an angle of 90 degrees between the first and second section of the positioner arm 144 to allow the container platform 146 to be maneuvered at a distance of L from the arm actuator 142. Further, the joint of the positioner arm 144 can hold the first and second sections of the positioner arm 144 at 0 degrees such that the sections are overlayed, thereby enabling the container platform 146 to pass directly over the arm actuator 142 at a distance of 0 L. The pair of separately actuatable positioner arms 144 can therefore maneuver the container platform 146 to an increased number of positions within the module housing 120 at varying radii from each arm actuator 142, thereby enabling accurate and precise positioning (e.g., translate and rotate) of the container platform 146 supporting a food container beneath a food-dispensing module 130 for ingredient dispensation.

5.3 Arm Actuators

Generally, the food production system 100 can include a set of arm actuators 142 arranged beneath the assembly plane of the autonomous assembly zone 122. Each arm actuator 142, in the set of arm actuators 142, can define a driveshaft, in a set of driveshafts, extending upward into the autonomous assembly zone 122 and configured to transiently engage a positioner arm 144, in the set of positioner arms 144, to locate the positioner arm 144 within the autonomous assembly zone 122.

In particular, in one implementation, a first module housing 120, in the sequence of module housings 120, can include a first positioner module 140 including a set of arm actuators 142 integrated within the first module housing 120 and including: a first arm actuator 142 defining a first driveshaft, in the set of driveshafts, extending upward into the autonomous assembly zone 122 (e.g., along a first driveshaft axis orthogonal the longitudinal assembly axis); and a second arm actuator 142 defining a second driveshaft, in the set of driveshafts, extending upward into the autonomous assembly zone 122 (e.g., along a second driveshaft axis orthogonal the longitudinal assembly axis and offset the first driveshaft axis). In this implementation, the first positioner module 140 can include a set of positioner arms 144 including a first positioner arm 144 and a second positioner arm 144 configured to cooperate to support and selectively move the container platform 146. The first positioner arm 144 can include: a first upper arm section pivotably coupled to a lower surface of the container platform 146; and a first lower arm section pivotably coupled to the first upper arm section at a first end and transiently mounted to the first driveshaft at a second end opposite the first end. The second positioner arm 144 can include: a second upper arm section coupled to the lower surface of the container platform 146; and a second lower arm section pivotably coupled to the second upper arm section at a third end and transiently mounted to the second driveshaft at a fourth end opposite the third end. For example, the first upper arm section—of the first positioner arm 144—can be pivotably coupled to the container platform 146 at the first end and pivotably coupled to the first lower arm section. The second upper arm section—of the second positioner arm 144—can be rigidly coupled to the container platform 146 and pivotably coupled to the second lower arm section. Alternatively, in another example, both the first upper arm section and the second upper arm section—of the first and second positioner arms 144—can be pivotably coupled to the container platform 146.

An operator may therefore install the first and second positioner arms 144 within the first module housing 120—such as in preparation for an operation period—by: mounting the second end of the first lower arm section to the first driveshaft of the first arm actuator 142; and mounting the fourth end of the second lower arm section to the second driveshaft of the second arm actuator 142. Similarly, the operator may rapidly remove the first and second arm actuators 142 from the first module housing 120—such as for cleaning—by: decoupling the second end of the first lower arm section from the first driveshaft; and decoupling the fourth end of the second lower arm section from the second driveshaft.

Additionally, a second module housing 120, in the sequence of module housings 120, can similarly include a second positioner module 140 including: a third arm actuator 142 defining a third driveshaft, in a second set of driveshafts, extending upward into the autonomous assembly zone 122 (e.g., along a third driveshaft axis orthogonal the longitudinal assembly axis); and a fourth arm actuator 142 defining a fourth driveshaft, in the second set of driveshafts, extending upward into the autonomous assembly zone 122 (e.g., along a fourth driveshaft axis orthogonal the longitudinal assembly axis and offset the second driveshaft axis). In this implementation, the second positioner module 140 can include a second set of positioner arms 144 including a third positioner arm 144 and a fourth positioner arm 144 configured to cooperate to support and selectively move a second container platform 146. The third positioner arm 144 can include: a third upper arm section pivotably coupled to a lower surface of the second conveyor platform; and a third lower arm section pivotably coupled to the third upper arm section at a fifth end and transiently mounted to the third driveshaft at a sixth end opposite the fifth end. The fourth positioner arm 144 can include: a fourth upper arm section coupled to the lower surface of the second conveyor platform; and a fourth lower arm section pivotably coupled to the fourth upper arm section at a seventh end and transiently mounted to the fourth driveshaft at an eighth end opposite the seventh end.

In the preceding implementation, each module housing 120, in the sequence of module housings 120, can therefore include a set of two arm actuators 142 configured to transiently engage and selectively rotate a set of two positioner arms 144 to move a corresponding container platform 146 supported by the set of two positioner arms 144.

6. Sequence of Positioner Modules

In one implementation, the food production system 100 includes a sequence of positioner modules 140 arranged (e.g., transiently, semi-permanently, or permanently) within the sequence of module housings 120 adjacent the sequence of food-dispensing modules 130. In this implementation, each module housing 120 can include a positioner module 140, in the sequence of positioner modules 140, extending between an inlet 124 and an outlet 126 of the corresponding module housing 120. Further, the food production station can include a sequence of conveyor handoffs configured to transfer food containers between contiguous positioner modules 140 in the sequence of positioner modules 140. The sequence of positioner modules 140—arranged within the sequence of module housings 120—can cooperate to transport a food container within and between module housings 120, in the sequence of module housings 120, and position the food container under corresponding food-dispensing modules 130 installed within the sequence of module housings 120 for dispensation of ingredients into the food container.

For example, the food production system 100 can include: a first module housing 120 configured to transiently house a first set of food-dispensing modules 130 in the sequence of food-dispensing modules 130; and a second module housing 120 configured to transiently house a second set of food-dispensing modules 130 in the sequence of food-dispensing modules 130. In this example, the food production system 100 can further include: a first positioner module 140 arranged within the first module housing 120 proximal the first set of food-dispensing modules 130; and a second positioner module 140 arranged within the second module housing 120 adjacent the second set of food-dispensing modules 130. The first positioner module 140 can be configured to transfer a food container from a first inlet 124 of the first module housing 120 to a first outlet 126 of the first module housing 120, for dispensation of ingredients from the first set of food-dispensing modules 130 into the food container. The second positioner module 140 can be configured to: receive the food container at a second inlet 124 of the second module housing 120 from the first outlet 126 of the first module housing 120; and transfer the food container from the second inlet 124 to a second outlet 126 of the second module housing 120 for dispensation of ingredients from the second set of food-dispensing modules 130 into the food container. Thus, the first and second positioner modules 140 can cooperate to transfer the first container toward corresponding food-dispensing modules 130, distributed between multiple module housings 120, for loading the food container with ingredients.

Further, in the preceding example, the controller 160 can actuate the set of positioner arms 144 of the first and second positioner modules 140 independently, thereby reducing wait times for food orders by reducing wait times between dispensation of ingredients in the autonomous assembly zone 122. For example, the controller 160 can: actuate a first set of positioner arms 144 of the first positioner module 140 to locate a first container platform 146—supporting a first food container—adjacent a first food-dispensing module 130, in the first set of food-dispensing modules 130, located in the first module housing 120; and halt actuation of the first set of positioner arms 144 of the first positioner module 140 and actuate the first food-dispensing module 130 to dispense ingredients into the first food container. Simultaneously, during dispensation of ingredients into the first food container seated on the first container platform 146 of the first positioner module 140, the controller 160 can: actuate a second set of positioner arms 144 of the second positioner module 140 to locate a second food container adjacent a second food-dispensing module 130, in the second set of food-dispensing modules 130, located in the second module housing 120; and halt actuation of the second set of positioner arms 144 of the second positioner module 140 and actuate the second food-dispensing module 130 to dispense ingredients into the second food container. The food production system 100 and/or the controller 160 can therefore independently actuate each positioner module 140, in the sequence of positioner modules 140, to simultaneously dispense ingredients into food containers transiently arranged within corresponding module housings 120.

6.1 Handoff Assembly

The food production system 100 can include a sequence of handoff assemblies: arranged proximal an outlet 126 of each module housing 120, in the sequence of module housings 120, such as adjacent and/or about a handoff window 156 formed between the outlet 126 of the module housing 120 and an inlet 124 of an adjacent module housing 120 in the sequence of module housings 120; and configured to transfer a food container between adjacent module housings 120 in the sequence of module housings 120.

In particular, a handoff assembly 150 can be arranged and/or installed (e.g., semi-permanently, permanently) within a module housing 120—proximal an outlet 126 of the module housing 120—and configured to: receive a food container from a first positioner module 140 arranged within a first module housing 120; and locate the food container on a second positioner module 140—such as on a container platform 146 of the second positioner module 140—arranged within a second module housing 120.

The handoff assembly 150 can include an elevator 152: approximately longitudinally centered with the handoff window 156; approximately concentric the container platform 146 in a handoff position—in which the positioner module 140 locates the food container in preparation for transfer to a subsequent container platform 146—within the handoff window 156; and operable in an extended position and a retracted position. The handoff assembly 150 can further include an elevator actuator 154 configured to selectively drive the elevator 152 between the extended position and the retracted position responsive to commands received from the controller 160.

In particular, the elevator 152 can be configured to: extend vertically upward toward the extended position, above the handoff position, to receive a food container—seated on a first container platform 146 of a first positioner module 140 in the handoff position—and therefore lift the food container from the first container platform 146; drop below the handoff position toward the retracted position to seat the food container on a second container platform 146 of a second positioner module 140 located in the handoff position in replacement of the first container platform 146. The elevator 152 can therefore lift the food container upward—off of the first container platform 146—and subsequently lower the food container downward onto a second container platform 146, thereby transferring the food container from the first positioner module 140 to the second positioner module 140.

In one implementation, the elevator 152 includes a set of (e.g., two) elevator platforms: arranged within the handoff window 156 (e.g., within a vertical plane defined by the handoff window 156); configured to receive and support a base surface of the food container in the extended position; and defining a center bore—arranged between the set of elevators platforms—concentric the container platform 146 in the handoff position. Therefore, the set of elevators 152 can be configured to extend vertically upward toward the extended position to: locate the set of elevator platforms about the container platform 146, such that the container platform 146 occupies the center bore; seat surfaces of the food container—extending outward from an edge of the container platform 146—on the set of elevator platforms; and then lift the food container from the container platform 146.

For example, the elevator 152 can include a first elevator platform arranged on a first side of a center axis—extending vertically through the handoff window 156—within the handoff window 156. The elevator 152 can further include a second elevator platform arranged on a second side of the center axis—opposite the first side—within the handoff window 156; and offset the first elevator platform by a fixed distance exceeding a width of the container platform 146 (e.g., in the handoff position) and less than a width of the food container (e.g., in the handoff position), such that the first and second elevator platforms can clear the container platform 146 when transitioning from the retracted position to the extended position and contact surfaces of the food container to lift the food container from the container platform 146.

Alternatively, in another implementation, the elevator 152 can include a set of elevator prongs-extending horizontally within the handoff window 156—configured to receive and support a rim (e.g., an overhanging edge) of the food container. For example, the elevator 152 can include: a first elevator prong-extending perpendicular a plane defined by the handoff window 156—arranged on a first side of the center axis; and a second elevator prong—extending parallel and offset the first elevator prong by a fixed distance approximating a width of the food container, such that the first and second elevator prongs seat below opposing edges of a rim of the food container (e.g., in the handoff position) in the retracted position and seat these opposing edges of the rim on the first and second elevator prongs to lift the food container from the container platform 146 in the extended position.

In one variation, an operator may interchange the elevator 152 of the handoff assembly 150 to accommodate food containers of different shapes and/or sizes over time.

7. Operation: Meal Assembly+Ingredient Plating

Within a module housing 120, the controller 160 can selectively actuate food-dispensing modules 130 to dispense ingredients into the food container. In particular, the controller 160 can receive instructions from the computer system to assemble a meal in the food container according to a particular food order (e.g., received from a patron).

For example, in response to the meal assembly instructions including an ingredient stored by a food-dispensing module 130 of a particular module housing 120, in the sequence of module housings 120, the controller 160 can actuate the set of positioner arms 144 within the module housing 120 to locate the container platform 146 in a first position beneath the food-dispensing module 130. For example, the controller 160 can: trigger a first arm actuator 142—coupled to a first positioner arm 144 of the positioner module 140—to actuate the first positioner arm 144 according to a first sequence of positions; and concurrently trigger a second arm actuator 142—coupled to a second positioner arm 144 of the positioner module 140—to actuate the second positioner arm 144 according to a second sequence of positions, in order to move the food container along a target pathway toward the first position beneath the food-dispensing module 130.

The controller 160 can then trigger the food-dispensing module 130 to dispense the ingredient into the food container, and then selectively actuate the set of positioner arms 144—via the set of arm actuators 142—to move the container platform 146 to a next location within the assembly plane. In particular, in one implementation, the controller 160 can trigger actuation of the set of positioner arms 144—to move the container platform 146 to a subsequent location within the assembly plane in the autonomous assembly zone 122—after a known time interval following triggering of dispensation of the ingredient into the food container. In particular, in this implementation, the controller 160 can: trigger the food-dispensing module 130 to dispense the ingredient into the food container; and, in response to expiration of the known time interval, actuate the set of positioner arms 144—via the set of arm actuators 142—to move the container platform 146 to a second position within the module housing 120, such as beneath a second food-dispensing module 130 and/or within the handoff window 156 of the module housing 120. Alternatively, in another implementation, the controller 160 can actuate the set of positioner arms 144 to the second position in response to receiving a signal from a weight sensor 170 (e.g., a load cell) indicating an increase in the weight of the food container by a target amount corresponding to dispensation of the first ingredient into the food container. The controller 160 can then actuate the set of positioner arms 144 to move the container platform 146 to the second position accordingly.

The controller 160 can therefore trigger the set of arm actuators 142 to drive rotation of the set of positioner arms 144 to selectively move the container platform 146—supporting the food container—across the assembly plane within the autonomous assembly zone 122. For example, the food production system 100 includes a first module housing 120: configured to transiently house a first food-dispensing module 130—defining a first rim configured to seat within a first slot, in a set of slots, of the receptacle 114 of the food preparation surface 112, the first slot laterally offset the longitudinal assembly axis by a first distance—configured to store and dispense units of a first ingredient toward the autonomous assembly zone 122; configured to transiently house a second food-dispensing module 130—defining a second rim configured to seat within a second slot, in the set of slots, of the receptacle 114, the second slot laterally offset the longitudinal assembly axis by a second distance less than the first distance—configured to store and dispense units of a second ingredient toward the autonomous assembly zone 122; and includes a positioner module 140 including the container platform 146, the set of positioner arms 144 supporting the container platform 146, and a set of arm actuators 142 configured to transiently engage and drive the set of positioner arms 144 to selectively move the container platform 146. In this example, the controller 160 can: receive a food order specifying the first ingredient and the second ingredient; trigger the set of arm actuators 142 to rotate the set of positioner arms 144 to move the container platform 146 across the assembly plane and locate the food container in a first location beneath the first food-dispensing module 130 and offset the autonomous assembly axis by approximately the first distance; trigger the first food-dispensing module 130 to dispense the first ingredient into the food container at the first location; trigger the set of arm actuators 142 to rotate the set of positioner arms 144 to move the container platform 146 across the assembly plane and locate the food container in a second location beneath the second food-dispensing module 130 and offset the autonomous assembly axis by approximately the second distance; and trigger the second food-dispensing module 130 to dispense the second ingredient into the food container at the second location.

The controller 160 can therefore selectively actuate the set of arm actuators 142 to drive rotation of the set of positioner arms 144 and therefore locate the food container—arranged on the container platform 146—below a corresponding food-dispensing module 130 aligned and/or laterally offset the longitudinal assembly axis, such as at any location on the assembly plane.

In particular, the controller 160 can selectively actuate the set of arm actuators 142 to drive rotation of the set of positioner arms 144 and therefore locate the food container along a vertical axis—orthogonal the longitudinal assembly axis and/or the assembly plane—extending from an outlet 126 of a food-dispensing module 130 arranged within the module housing 120. For example, the food production system 100 can include a first module housing 120: configured to transiently house a first food-dispensing module 130 configured to seat within a first slot of the receptacle 114, configured to store and dispense units of the first ingredient, and defining a first outlet configured to release units of the first ingredient along a first vertical axis intersecting the first location; configured to transiently house a second food-dispensing module 130 configured to seat within a second slot of the receptacle 114 adjacent the first slot, configured to store and dispense units of the second ingredient; and defining a second outlet configured to release units of the second ingredient along a second vertical axis intersecting the second location and offset the first vertical axis by a first distance; and including a positioner module 140 including the container platform 146, the set of positioner arms 144 supporting the container platform 146, and a set of arm actuators 142 configured to transiently engage and drive the set of positioner arms 144 to selectively move the container platform 146. In this example, the controller 160 can: trigger the set of arm actuators 142 to rotate the set of positioner arms 144 to move the container platform 146 across the assembly plane and locate the food container in a first location, aligned with the first vertical axis, below the first outlet; trigger the first food-dispensing module 130 to dispense the first ingredient into the food container at the first location; trigger the set of arm actuators 142 to rotate the set of positioner arms 144 to move the container platform 146 across the assembly plane from the first location to a second location to locate the food container in the second location, aligned with the second vertical axis, below the second outlet; and trigger the second food-dispensing module 130 to dispense the second ingredient into the food container at the second location.

7.1 Operation: Plating Pattern

In one implementation, the positioner module 140 can maneuver the food container along a particular pathway within the module housing 120 in order to achieve a target plating pattern defined for a particular food type and/or food order. For example, the controller 160 can actuate the set of positioner arms 144 between dispensation of ingredients to rotate an orientation of a food container relative the food-dispensing modules 130 in order to achieve a segmented radial plating pattern of ingredients within the food container. For example, the set of positioner arms 144 can be configured to rotate an acai bowl between food-dispensing modules 130, such that different ingredients are located in different regions of the acai bowl.

Additionally or alternatively, the positioner module 140 can maneuver the food container, via the set of positioner arms 144, in a particular pattern during a dispensation interval—in which the food-dispensing module 130 dispenses the ingredient into the food container—in order to achieve a target plating pattern. For example, the set of positioner arms 144 can move the food container in a circular pattern or lightly shake the food container back and forth under the food dispenser module during the time interval that the food-dispensing module 130 dispenses an ingredient.

In another example, the controller 160 can receive instructions from a remote computer to prepare a salad in a food container. The controller 160 triggers a first positioner module 140 of the sequence of positioner modules 140 to move the food container through a first module housing 120 of the autonomous assembly zone 122 including a food-dispensing module 130 that dispenses lettuce, a second module housing 120 including a food-dispensing module 130 that dispenses toppings such as raw vegetables, and a third module housing 120 including a food-dispensing module 130 that dispenses salad dressing. The controller 160 actuates the positioner module 140 of the third module housing 120 to maneuver the food container in a zigzag pattern under the food-dispensing module 130 such that salad dressing is dispensed in a zigzag pattern throughout the food container.

In another example, the set of positioner arms 144 can move the food container forward and/or laterally during dispensation of a first ingredient to form a first ingredient layer within the food container. Then, during dispensation of a second ingredient, the set of positioner arms 144 can move the food container forward and/or laterally in order to form a second ingredient layer—arranged across the first ingredient layer—within the food container. Therefore, the positioner module 140 can distribute an ingredient throughout the food container or disperse a sauce over an area of the food container without actuation of the food-dispensing module 130.

The positioner module 140 can therefore be configured to enable autonomous assembly of food orders exhibiting different plating patterns, including radial patterns, segmented patterns, and/or layered patterns of ingredients within the food container.

For example, a first module housing 120 can: be configured to transiently house a first food-dispensing module 130, in the set of food-dispensing modules 130, configured to store and dispense units of a first ingredient toward the autonomous assembly zone 122; be configured to transiently house a second food-dispensing module 130, in the set of food-dispensing modules 130, configured to store and dispense units of a second ingredient toward the autonomous assembly zone 122; and include a positioner module 140 including the container platform 146, the set of positioner arms 144 supporting the container platform 146, and a set of arm actuators 142 configured to transiently engage and drive the set of positioner arms 144 to selectively move the container platform 146. In this example, the controller 160 can: receive a food order specifying a first ingredient and a second ingredient; access a target plating pattern defined for the food order and specifying a first region of the food container for dispensation of the first ingredient and a second region of the food container for dispensation of the second ingredient; trigger the set of arm actuators 142 to rotate the set of positioner arms 144 to move the container platform 146 across the assembly plane and locate the first region of the food container in a first location beneath the first food-dispensing module 130; trigger the first food-dispensing module 130 to dispense the first ingredient into the first region of the food container at the first location; trigger the set of arm actuators 142 to rotate the set of positioner arms 144 to move the container platform 146 across the assembly plane and locate the second region of the food container in a second location beneath the second food-dispensing module 130; and trigger the second food-dispensing module 130 to dispense the second ingredient into the second region of the food container at the second location.

7.2 Operation: Positioner Arm Pathway

Generally, the controller 160 can trigger the set of arm actuators 142—of a positioner module 140 installed within a module housing 120—to selectively drive and/or rotate the set of positioner arms 144 to move the container platform 146 according to a target pathway defined for the container platform 146, such as based on a set of target positions defined for the container platform 146.

For example, the controller 160 can: access a set of current arm positions (e.g., location and/or orientation within the assembly plane) of the set of positioner arms 144 and/or a current platform location of the container platform 146; access a target location—such as below a particular food-dispensing module 130—defined for the container platform 146; in near real-time, calculate a target pathway for the container platform 146—between the current platform location and the target location—based on the set of current arm positions, the current platform location, and/or the target location; and trigger the set of arm actuators 142 to drive the set of positioner arms 144 accordingly in order to move the container platform along the target pathway.

In particular, the controller 160 can trigger the set of arm actuators 142 to drive the set of positioner arms 144—individually and/or in combination—to achieve a target pathway for movement of the container platform 146 (and therefore a food container arranged on the container platform 146) across the assembly plane below the set of food-dispensing modules 130, such as between a first location on the assembly plane and a second location on the assembly plane. For example, the controller 160 can derive and/or select a particular target pathway for the container platform 146 configured to: locate the food container below a particular food-dispensing module 130 in the set of food-dispensing modules 130; locate a particular region of the food container below the particular food-dispensing module 130, such as according to a target plating pattern; and/or avoid collision of the food container—and/or components of the positioner module 140—with walls of the module housing 120 and/or other components arranged within the module housing 120. Furthermore, the controller 160 can derive and/or select a particular target pathway configured to minimize a duration of an assembly period for a particular food order.

In one example, the food production system 100 includes a first module housing 120: configured to transiently house a first food-dispensing module 130 configured to store and dispense units of a first ingredient toward the autonomous assembly zone 122; configured to transiently house a second food-dispensing module 130 configured to store and dispense units of a second ingredient toward the autonomous assembly zone 122 and a first positioner module 140 arranged within the autonomous assembly zone 122 and including the container platform 146, the set of positioner arms 144 supporting the container platform 146, and the set of arm actuators 142 configured to transiently engage and drive the set of positioner arms 144 to selectively move the container platform 146 across the assembly plane. In this example, the controller 160 can be configured to: receive a food order specifying the first ingredient; trigger the set of arm actuators 142 to rotate the set of positioner arms 144 to drive the container platform 146 across a first pathway on the assembly plane from an initial location to a first location beneath the first food-dispensing module 130; trigger the first food-dispensing module 130 to dispense the first ingredient into the food container at the first location; trigger the set of arm actuators 142 to rotate the set of positioner arms 144 to drive the container platform 146 across a second pathway on the assembly plane from the first location to a second location beneath the second food-dispensing module 130; and trigger the second food-dispensing module 130 to dispense the second ingredient into the food container at the second location.

In one implementation, the controller 160 can calculate a target pathway for the container platform 146 (e.g., in near real-time) based on characteristics of the food container supported by the positioner assembly. For example, in this implementation, the controller 160 can: access a set of characteristics of the food container, such as including a shape, a height, a circumference, a length, a weight, etc.; and calculate a target pathway—such as defining a sequence of coordinates along the assembly plane and/or a speed, acceleration, and/or rotation of the container platform 146 based on the set of characteristics.

In one example, the controller 160 can calculate a target pathway for the container platform 146 (e.g., in near real-time) between a first location on the assembly plane—arranged beneath a first outlet of a first food-dispensing module 130 installed within a module housing 120—and a second location on the assembly plane beneath a second outlet of a second food-dispensing module 130 installed within the module housing 120. In particular, in this example, the controller 160 can: access a first weight of the food container—seated on the container platform 146 of the positioner module 140 and loaded with units of ingredients—at the first location, captured by a weight sensor; access a fixed size (e.g., a length, a height, a dimension) of the food container; and calculate a pathway for the container platform 146—and therefore the food container—based on the first location, the second location, the first weight, and the fixed size of the food container.

Additionally or alternatively, in another implementation, the controller 160 can calculate a target pathway for the container platform 146—such as between two locations on the assembly plane—configured to minimize a distance traveled by the container platform 146 and/or the food container and therefore minimize a duration required for moving the container platform 146 and/or the food container between locations on the assembly plane.

7.3 Operation: Positioner Arm Calibration

The controller 160 can detect an orientation of each arm of the set of positioner arms 144 in a module housing 120 based on signals received from a set of positional sensors 170 arranged within the module housing 120. For example, the module housing 120 can include a first and second magnetic encoder coupled to the first and second arm actuators 142 of the first and second positioner arms 144 of the positioner module 140. The controller 160 can therefore: receive signals output by the first and second magnetic encoder; and interpret an orientation of each of the first and second positioner arms 144 based on a known initial position signal (hereinafter a "homing signal") of the magnetic encoder.

For example, during setup of a module housing 120, such as during installation, an operator may locate a positioner arm 144 onto a keyed or splined actuator. The controller 160 can: receive a homing signal from a magnetic encoder of the arm actuator 142 representing the position of the positioner arm 144 on the arm actuator 142 (e.g., a position at which the key of the positioner arm 144 coupler is in contact with the magnetic encoder); and interpret an orientation of the positioner arm 144 within the module housing 120 based on the homing signal. Further, the controller 160 can: access an image captured by an optical sensor 170 arranged within the module housing 120; verify the position and/or orientation of the positioner arm 144 within the module housing 120 and validate the homing signal based on this image; and, in response to verifying the position and/or orientation, store the homing signal.

In one implementation, the controller 160 can actuate the positioner arm 144 of the positioner module 140 to execute a calibration cycle. In particular, during execution of a calibration cycle, the controller 160 can: actuate the positioner arm 144 to a first position; access a first signal recorded by the position sensor 170 with the positioner arm 144 in the first position; and calculate an orientation of the positioner arm 144 within the module housing 120 based on a difference between the first signal—output by the magnetic encoder at the first position—and the homing signal. The controller 160 can then: actuate the positioner arm 144 to a second position and calculate a second orientation of the positioner arm 144 at the second position; actuate the positioner arm 144 to a third position and calculate a third orientation of the positioner arm 144 at the third position; etc.

In order to validate the calibration data, the controller 160 can: access images captured by the optical sensor 170 during the calibration cycle; and compare a predicted orientation of the positioner arm 144 (based on the magnetic encoder signal) to an actual orientation of the positioner arm 144 depicted in images captured by the optical sensor 170. Once the controller 160 completes this calibration cycle, the controller 160 can accurately predict a position and/or orientation of the positioner arm 144 within the module housing 120 based on the homing signal received during set up by comparing a current magnetic encoder reading to the magnetic encoder homing signal. The controller 160 can therefore monitor the output of a magnetic encoder throughout assembly of food orders via actuation of the set of positioner arms 144 and monitor (e.g. periodically checks the value of or detects anomalous values of) the value of the homing signal to interpret the orientation of the positioner arm 144 within the module housing 120 and/or accurately locate the positioner arm 144 in a particular orientation within the module housing 120.

7.4 Operation: Food Container Handoff

The controller 160 actuates positioner modules 140 of the food production system 100 to pass the food container from a first module housing 120 to a second module housing 120 such that the food container can travel to each module housing 120 and receive ingredients to assemble a meal.

At the end of the ingredient dispensing process in a first module housing 120, the controller 160 actuates the first set of positioner arms 144 to locate the food container in a handoff position, (e.g., located within a handoff zone coextensive the first handoff window 156 of the first module housing 120 and a second handoff window 156 of a second module housing 120 contiguous with the first housing within the sequence of housings) within or near the handoff window 156 of the module housing 120. In response to controller 160 instructions indicating that an ingredient was dispensed within this module housing 120, the controller 160 can read signals from sensors 170 in the handoff window 156 (e.g., optical sensor 170, depth sensor 170, or load cell) to confirm that the ingredients were actually dispensed, and only proceed with the handoff process if ingredient dispensing is confirmed.

Then, the controller 160 actuates the container elevator 152 to extend vertically from a bottom surface of the handoff window 156. When the container elevator 152 extends, the holder of the container elevator 152 lifts the food container off of the container platform 146 of the first set of positioner arms 144. The controller 160 actuates the first set of positioner arms 144, to move to a third position outside of the handoff window 156 so that the first set of positioner arms 144 avoids collision with a second set of positioner arm 144 of an adjacent module housing 120. The controller 160 actuates the second set of positioner arms 144 of the adjacent second module housing 120 to a fourth position within the handoff window 156 with the container platform 146 of the second set of positioner arms 144 located below the food container. The controller 160 retracts the container elevator 152, lowering the food container until the bottom of the food container rests on the container platform 146 of the second set of positioner arms 144. The controller 160 lowers the container elevator 152 below the second set of positioner arms 144. The controller 160 actuates the second set of positioner arms 144, now supporting the food container on a second container platform 146, to a fifth position under a food-dispensing module 130 of the second module housing 120.

The controller 160 repeats these steps and the food container filling steps to dispense an ingredient into the food container at each module housing 120 and move the food container to a next module housing 120 to complete assembly of the meal.

7.5 Handoff Assembly: First and Second Module Housings

In one implementation, the food production system 100 can include: a first module housing 120, in the sequence of module housings 120, defining an outlet 126; a second module housing 120, in the sequence of module housings 120, defining an inlet 124 aligned to the outlet 126 of the first module housing 120; and a handoff assembly 150 configured to transfer food containers from within the first module housing 120 to within the second module housing 120.

In particular, in this implementation, the food production system 100 includes the first module housing 120: defining a first autonomous assembly zone 122 extending along a longitudinal assembly axis arranged below the food preparation surface 112; configured to transiently house a first food-dispensing module 130 configured to store and dispense units of a first ingredient toward the autonomous assembly zone 122, the first food-dispensing module 130 seated within the receptacle 114 extending toward the autonomous assembly zone 122 within the first module housing 120; including a first positioner module 140—including a first container platform 146, a first set of positioner arms 144 configured to support the first container platform 146, and a first set of arm actuators 142 configured to selectively engage and drive rotation of the first set of positioner arms 144—arranged within the autonomous assembly zone 122; and defining an outlet 126 arranged coaxial the longitudinal assembly axis. In this implementation, the food production system 100 further includes the second module housing 120: defining a second autonomous assembly zone 122 extending along the longitudinal assembly axis extending through the first module housing 120 and the second module housing 120 below the food preparation surface 112; is configured to transiently house a second food-dispensing module 130 configured to store and dispense units of a second ingredient toward the autonomous assembly zone 122, the second food-dispensing module 130 seated within the receptacle 114 extending toward the second autonomous assembly zone 122 within the second module housing 120; and includes a second positioner module 140—including a second container platform 146, a second set of positioner arms 144 configured to support the second container platform 146, and a second set of arm actuators 142 configured to selectively engage and drive rotation of the second set of positioner arms 144—arranged within the second autonomous assembly zone 122; and defining an inlet 124 arranged coaxial the longitudinal assembly axis and aligned to the outlet 126 of the first module housing 120.

Furthermore, the food production system 100 includes the handoff assembly 150 arranged proximal the outlet 126 of the first module housing 120 and configured to: receive a food container from the first container platform 146 of the first positioner module 140; and locate the food container on the second container platform 146 of the second positioner module 140 within the second module housing 120. In particular, the controller 160 can be configured to trigger the handoff assembly 150 to transfer the food container from the first container platform 146 of the first positioner assembly to the second container platform 146 of the second positioner assembly via—the inlet 124 and the outlet 126—for transfer of the food container from within the first module housing 120 to within the second module housing 120.

In particular, in one example, the handoff assembly 150 includes: an elevator 152 arranged approximately concentric the second container platform 146 in a handoff location and operable in an extended position and a retracted position; and an elevator actuator 154 configured to drive the elevator 152 between the extended position and the retracted position responsive to commands received from the controller 160. In this example, the controller 160 can: trigger the first set of arm actuators 142 to rotate the first set of positioner arms 144 to move the first container platform 146 across the first assembly plane and locate the food container in a handoff location proximal the outlet 126; trigger the elevator actuator 154 to drive the elevator 152 from the retracted position to the extended position to locate the food container on the elevator platform and lift the food container from the first container platform 146; trigger the second set of arm actuators 142 to rotate the second set of positioner arms 144 to move the second container platform 146 across the second assembly plane and locate the second container platform 146 in the handoff location; and trigger the elevator actuator 154 to drive the elevator 152 from the extended position to the retracted position to seat the food container on the second container platform 146 of the second positioner module 140.

8. Error Handling

In one implementation, the controller 160 monitors data from the set of sensors 170 of the module housing 120 to detect errors. For example, the controller 160 can detect instances of operation errors, such as including instances of food container tipping and spilling, food container overfill, temperature anomalies, missing ingredients, and/or installation errors.

In particular, the controller 160 can record signals from the set of sensors 170, and compare these signals to expected values or ranges of the signals to check for errors in the system. The controller 160 can derive trends of a timeseries of signals it receives from each sensor 170 in order to derive a set of metrics such as a mean output, peak output, and low output. The controller 160 can derive an expected range of signal values based on the metrics, or access a database of pre-determined expected metrics for the food production system 100, and leverage the expected range of a sensor signal to detect errors. For example, the controller 160 can receive a sensor signal outside of an expected range (e.g., more than 100% above the mean signal value) and detect errors in the food production system 100.

In particular, the controller 160 can: interpret timeseries control data—such as temperatures, ingredient levels, conveyor position and/or movement, instance and/or amounts of ingredients dispensed by food-dispensing modules 130, etc.—based on signals output by the set of sensors 170; and detect instances of error events based on the timeseries control data. For example, the controller 160 can detect an error event corresponding to misalignment of a food container below a food-dispensing module 130 prior to dispensation of ingredients—by this food-dispensing module 130—into the food container. In particular, in this example, the controller 160 can: interpret a first position of a center of the food container—relative a target position coaxial the food-dispensing module 130—based on a signal captured by an optical sensor 170 (e.g., installed within the module housing 120, installed on the food-dispensing module 130) and/or by a load sensor 170 installed on the container platform 146; calculate a deviation between the first position and the target position; and, in response to the deviation exceeding a threshold deviation, detect an error event associated with misalignment of the food container. The controller 160 can then trigger the positioner module 140—such as via the set of arm actuators 142—to move the center of the food container toward the target position.

In one example, to detect a tipped food container or risk of a food container tipping, the controller 160 monitors data from a weight sensor 170 coupled to a container platform 146 supporting a food container. Responsive to the signal from the weight sensor 170 indicating the combined center of mass of the container platform 146, food container, and ingredients in the food container within a first threshold range (e.g., the combined center of mass is within a first threshold radius from a known center of mass of a container platform 146 lacking a food container), the controller 160 detects no error. Responsive to the signal from the Weight sensor 170 indicating the combined center of mass of the container platform 146, food container, and ingredients in the food container within a second threshold range (e.g., the combined center of mass is within a second threshold radius, greater than the first threshold radius, from a known center of mass of a container platform 146 lacking a food container), the controller 160 detects a first level error. The controller 160 activates a light associated with the module housing 120 in which the error occurred to illuminate on a user interface to alert an operator. The controller 160 can mitigate the first level error by capping the maximum velocity and acceleration of each set of positioner arms 144 interacting with the food container to prevent tipping. Responsive to the signal from the weight sensor 170 indicating the combined center of mass of the container platform 146, food container, and ingredients in the food container exceed a second threshold range (e.g., the combined center of mass is greater than the $2^{nd}$ threshold radius from a known center of mass of a container platform 146 lacking a food container), the controller 160 detects a first second level error. The controller 160 may instruct a second light on the user interface to illuminate to warn the operator of the second level error. The controller 160 can stop actuation of the container platform 146 until the controller 160 detects the center of mass is within the first threshold range (e.g., such as if the food container has been adjusted by an operator to or the food container has settled into a more stable position).

In another example, to detect an overfilled food container, the controller 160 monitors data from optical and/or depth sensors 170. The controller 160 receives an image from the optical sensor 170 or a reading from the depth sensor 170 indicating a height of the food within the food container. Responsive to the height of the food being over a threshold height (e.g., the food height is above the clearance of the handoff window 156 or the food-dispensing module 130), the controller 160 detects an error and illuminates an error light on the user interface. The controller 160 can stop actuation of the container platform 146 supporting the overfilled food container. The user interface can display diagnostic messages including prompting an operator check for a food-dispensing module 130 that is stuck open and therefore overfilling bowls.

In yet another example, to detect a spill, the controller 160 monitors load cell data indicating the mass of the food container with the ingredients. Responsive to the mass of the food container decreasing by a threshold amount from a first data point received by the controller 160 to a second data point received by the controller 160, the controller 160 detects an error. The controller 160 can illuminate a spill error light on the user interface and stop actuation of the container platform 146 supporting the food container.

In yet another example, to detect a missing ingredient (e.g., an ingredient including in a food order did not dispense), the controller 160 monitors the load cell data representing the mass of the food container. The controller 160 accesses a database of masses of each ingredient and calculates an expected mass of the food container at each module housing 120. Responsive to receiving a local cell signal indicating a mass above a threshold error range of that mass (e.g., 10% more than the projected mass), the controller 160 detects an error and illuminates a missing ingredient light on the user interface. The user interface can prompt an operator to check a food-dispensing module 130 of the module housing 120 in which the error occurred to determine if the hopper of the food-dispensing module 130 is empty or if the dispenser is clogged.

In one implementation, in which the module housing 120 includes a weight sensor 170 configured to output signals representing timeseries weights of the food container on the container platform 146, the controller 160 can selectively trigger dispensation of additional units of an ingredient, such as prior to triggering relocation of the food container within the assembly plane. For example, the controller 160 can: receive a food order specifying a first ingredient; trigger the set of arm actuators 142 to rotate the set of positioner arms 144 to move the container platform 146 across the assembly plane and locate the food container in a first location beneath the first food-dispensing module 130; trigger the first food-dispensing module 130 to dispense the first amount of the first ingredient into the food container at the first location at a first time; access a first signal output by the weight sensor 170 at the first time and representing a first weight of the food container at the first time; interpret a first dispensed amount of the first ingredient dispensed into the food container based on the first weight; characterize a difference between the first amount and the first dispensed amount; and, in response to the difference exceeding a threshold difference, trigger the first food-dispensing module 130 to dispense a second amount of the first ingredient into the food container based on the difference. Furthermore, based on the difference between the first amount and the first dispensed amount, the controller 160 can automatically adjust a set of dispense parameters of the first food-dispensing module—such as in order to decrease this difference during dispensation of the first ingredient into a subsequent food container—to more accurately dispense target amounts of the first ingredient into food containers and thereby increase order throughput by minimizing time spent adjusting and/or correcting amounts of ingredients dispensed into the food container.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A food production system comprising:
    a manual food preparation surface at work surface height defining a receptacle configured to transiently receive a set of food-dispensing modules configured to store and dispense ingredients for preparation of units of a food product type;
    a first module housing:
        supporting the manual food preparation surface;
        defining an autonomous assembly zone extending along a longitudinal assembly axis arranged below the manual food preparation surface;
    configured to transiently house a first food-dispensing module, in the set of food-dispensing modules, configured to store and dispense units of a first ingredient toward the autonomous assembly zone, the first food-dispensing module seated within the receptacle extending toward the autonomous assembly zone within the first module housing;
    configured to transiently house a second food-dispensing module, in the set of food-dispensing modules, configured to store and dispense units of a second ingredient toward the autonomous assembly zone, the second food-dispensing module seated within the receptacle and extending toward the autonomous assembly zone within the first module housing; and
    comprising a first positioner module arranged within the autonomous assembly zone and comprising:
        a container platform configured to receive and support a food container;
        a set of positioner arms configured to cooperate to support and move the container platform across an assembly plane, coplanar the longitudinal assembly axis, to position the food container below food-dispensing modules for dispensation of ingredients into the food container; and
        a set of arm actuators arranged beneath the assembly plane, each arm actuator, in the set of arm actuators, defining a driveshaft, in a set of driveshafts, extending upward into the autonomous assembly zone and configured to transiently engage a positioner arm, in the set of positioner arms, to locate the positioner arm within the autonomous assembly zone; and
        a controller configured to:
            receive a food order specifying the first ingredient and the second ingredient;
            trigger the set of arm actuators to rotate the set of positioner arms to move the container platform across the assembly plane and locate the food container in a first location beneath the first food-dispensing module;
            trigger the first food-dispensing module to dispense the first ingredient into the food container at the first location;
            trigger the set of arm actuators to rotate the set of positioner arms to move the container platform across the assembly plane and locate the food container in a second location beneath the second food-dispensing module; and
            trigger the second food-dispensing module to dispense the second ingredient into the food container at the second location.

2. The food production system of claim 1:
    wherein each positioner arm, in the set of positioner arms defines:
        a lower section configured to mount to a corresponding driveshaft, in the set of driveshafts, to mechanically couple to an arm actuator in the set of arm actuators; and
        an upper section pivotably coupled to the lower section and configured to receive the container platform; and
    wherein the controller is configured to:
        trigger the set of arm actuators to rotate the set of positioner arms to drive the container platform across a first pathway on the assembly plane from an initial location to the first location; and
        trigger the set of arm actuators to rotate the set of positioner arms to drive the container platform across a second pathway on the assembly plane from the first location to the second location.

3. The food production system of claim 1:
    wherein the first module housing is configured to transiently house the first food-dispensing module:
        defining a first rim configured to seat within a first slot of the receptacle; and
        defining a first base:
            extending from the first rim and toward the autonomous assembly zone;
            configured to seat within the first module housing below the manual food preparation surface and above the first positioner module; and
            configured to store and dispense units of the first ingredient; and
    wherein the first module housing is configured to transiently house the second food-dispensing module:
        defining a second rim configured to seat within a second slot of the receptacle adjacent and laterally offset the first slot; and
        defining a second base:
            extending from the second rim and toward the autonomous assembly zone;
            configured to seat within the first module housing below the manual food preparation surface and above the first positioner module; and
            configured to store and dispense units of the second ingredient.

4. The food production system of claim 3:
    wherein the first module housing is configured to transiently house the first food-dispensing module defining the first rim configured to seat within the first slot of the receptacle laterally offset the longitudinal assembly axis by a first distance;
    wherein the first module housing is configured to transiently house the second food-dispensing module defining the second rim configured to seat within the second slot of the receptacle laterally offset the longitudinal assembly axis by a second distance less than the first distance; and wherein the controller is configured to:
  trigger the set of arm actuators to rotate the set of positioner arms to move the container platform across the assembly plane and locate the food container in the first location beneath the first food-dispensing module and offset the longitudinal assembly axis by approximately the first distance; and
  trigger the set of arm actuators to rotate the set of positioner arms to move the container platform across the assembly plane and locate the food container in the second location beneath the second food-dispensing module and offset the longitudinal assembly axis by approximately the second distance.

5. The food production system of claim 1:
wherein the first module housing defines an inlet arranged coaxial the longitudinal assembly axis;
further comprising a second module housing:
  supporting the manual food preparation surface and defining the autonomous assembly zone extending along the longitudinal assembly axis extending through the first module housing and the second module housing below the manual food preparation surface;
  defining an outlet arranged coaxial the longitudinal assembly axis and aligned to the inlet of the first module housing;
  configured to transiently house a third food-dispensing module configured to store and dispense units of a third ingredient toward the autonomous assembly zone, the third food-dispensing module seated within the receptacle extending toward the autonomous assembly zone within the second module housing; and
  comprising a second positioner module arranged within the autonomous assembly zone and comprising:
    a second container platform configured to receive and support the food container;
    a second set of positioner arms configured to cooperate to support and move the container platform across a second assembly plane, coplanar the longitudinal assembly axis, to position the food container below food-dispensing modules housed within the second module housing for dispensation of ingredients into the food container;
    a second set of arm actuators arranged beneath the second assembly plane, each arm actuator, in the second set of arm actuators, defining a driveshaft, in a second set of driveshafts, extending upward into the autonomous assembly zone and configured to transiently engage a positioner arm, in the second set of positioner arms, to locate the positioner arm within the autonomous assembly zone within the second module housing; and
    a handoff assembly arranged proximal the outlet within the second module housing and configured to:
      receive the food container from the second container platform of the second positioner module; and
      locate the food container on the container platform of the first positioner module within the first module housing; and
wherein the controller is configured to:
  trigger the second set of arm actuators to rotate the second set of positioner arms to move the second container platform across the second assembly plane and locate the food container in a third location beneath the third food-dispensing module;
  trigger the third food-dispensing module to dispense the third ingredient into the food container at the third location; and
  trigger the handoff assembly to transfer the food container from the second container platform of the second positioner module to the container platform of the first positioner module.

6. The food production system of claim 5:
wherein the handoff assembly comprises:
  an elevator arranged approximately concentric the second container platform in a handoff location and operable in an extended position and a retracted position; and
  an elevator actuator configured to drive the elevator between the extended position and the retracted position responsive to commands received from the controller; and
wherein the controller is configured to:
  trigger the second set of arm actuators to rotate the second set of positioner arms to move the second container platform across the second assembly plane and locate the food container in the handoff location proximal the outlet;
  trigger the elevator actuator to drive the elevator from the retracted position to the extended position to locate the food container on the elevator and lift the food container from the second container platform;
  trigger the set of arm actuators to rotate the set of positioner arms to move the container platform across the assembly plane and locate the container platform in the handoff location; and
  trigger the elevator actuator to drive the elevator from the extended position to the retracted position to seat the food container on the container platform of the first positioner module.

7. The food production system of claim 1:
wherein the first module housing is configured to:
  transiently house the first food-dispensing module:
    configured to seat within a first slot of the receptacle;
    configured to store and dispense units of the first ingredient; and
    defining a first outlet configured to release units of the first ingredient along a first vertical axis intersecting the first location; and
  transiently house the second food-dispensing module:
    configured to seat within a second slot of the receptacle adjacent the first slot;
    configured to store and dispense units of the second ingredient; and
    defining a second outlet configured to release units of the second ingredient along a second vertical axis intersecting the second location and offset the first vertical axis by a first distance; and
wherein the controller is configured to:
  trigger the set of arm actuators to rotate the set of positioner arms to move the container platform across the assembly plane and locate the food container in the first location, aligned with the first vertical axis, below the first outlet; and
  trigger the set of arm actuators to rotate the set of positioner arms to move the container platform across the assembly plane from the first location to the second location to locate the food container in the second location, aligned with the second vertical axis, below the second outlet.

8. The food production system of claim 1:
wherein the manual food preparation surface defines the receptacle defining a set of slots, each slot, in the set of slots, configured to transiently receive a food-dispensing module in the set of food-dispensing modules;
wherein the first module housing is configured to:
 transiently house the first food-dispensing module, seated within a first slot, in the set of slots, of the receptacle;
 transiently house the second food-dispensing module, seated within a second slot, in the set of slots, of the receptacle; and
 transiently house a third food-dispensing module configured to store and dispense units of a third ingredient toward the autonomous assembly zone, the third food-dispensing module seated within a third slot, in the set of slots, of the receptacle extending toward the autonomous assembly zone within the first module housing; and
wherein the controller is configured to:
 receive the food order indicating the first ingredient, the second ingredient, and the third ingredient;
 trigger the set of arm actuators to rotate the set of positioner arms to move the container platform across the assembly plane and locate the food container in a third location beneath the third food-dispensing module in the third slot; and
 trigger the third food-dispensing module to dispense the third ingredient into the food container at the third location.

9. The food production system of claim 1:
wherein the set of arm actuators comprises:
 a first arm actuator defining a first driveshaft, in the set of driveshafts, extending upward into the autonomous assembly zone; and
 a second arm actuator defining a second driveshaft, in the set of driveshafts, extending upward into the autonomous assembly zone; and
wherein the set of positioner arms comprises:
 a first positioner arm comprising:
  a first upper arm section coupled to a lower surface of the container platform; and
  a first lower arm section pivotably coupled to the first upper arm section at a first end and transiently mounted to the first driveshaft at a second end opposite the first end; and
 a second positioner arm comprising:
  a second upper arm section coupled to the lower surface of the container platform; and
  a second lower arm section pivotably coupled to the second upper arm section at a third end and transiently mounted to the second driveshaft at a fourth end opposite the third end.

10. The food production system of claim 1, wherein the controller is configured to:
 access a target plating pattern defined for the food order and specifying:
  a first region of the food container for dispensation of the first ingredient; and
  a second region of the food container for dispensation of the second ingredient;
 trigger the set of arm actuators to rotate the set of positioner arms to move the container platform across the assembly plane and locate the first region of the food container in the first location beneath the first food-dispensing module;
 trigger the first food-dispensing module to dispense the first ingredient into the first region of the food container at the first location;
 trigger the set of arm actuators to rotate the set of positioner arms to move the container platform across the assembly plane and locate the second region of the food container in the second location beneath the second food-dispensing module; and
 trigger the second food-dispensing module to dispense the second ingredient into the second region of the food container at the second location.

11. The food production system of claim 1:
further comprising a flexible tray configured to transiently install below the first food-dispensing module and the second food-dispensing module, below the container platform, and about the set of driveshafts within the autonomous assembly zone to collect food debris; and
wherein the first module housing defines a window configured to enable removal of the flexible tray for cleaning and installation of the flexible tray for collecting food debris during assembly of units of the food product type.

12. The food production system of claim 11:
wherein the flexible tray, the set of positioner arms, the container platform, and the food container cooperate to define a first height;
wherein the autonomous assembly zone is arranged below the manual food preparation surface and defines a fixed height exceeding the first height; and
wherein the controller is configured to:
 trigger the set of arm actuators to rotate the set of positioner arms to move the container platform across the assembly plane and locate the food container in the first location with a rim of the food container located a second distance, less than a threshold distance and the fixed height, from a first outlet of the first food-dispensing module; and
 trigger the set of arm actuators to rotate the set of positioner arms to move the container platform across the assembly plane and locate the food container in the second location with the rim of the food container located a third distance, less than the threshold distance and the fixed height, from a second outlet of the second food-dispensing module.

13. The food production system of claim 1:
further comprising a container-dispensing module configured to store and dispense food containers; and
wherein the first positioner module comprises:
 the container platform:
  transiently coupled to the set of positioner arms during a first time period;
  defining a first upper surface of a first surface profile corresponding to a first container profile of food containers loaded in the container-dispensing module during the first time period; and
  configured to transiently receive and retain food containers of the first container profile on the first upper surface; and
 a second container platform:
  transiently coupled to the set of positioner arms during a second time period;
  defining a second upper surface of a second surface profile corresponding to a second container profile of food containers loaded in the container-dispensing module during the second time period; and configured to transiently receive and retain food containers of the second container profile on the second upper surface.

14. The food production system of claim 1:
wherein the first module housing further comprises a weight sensor configured to output signals representing timeseries weights of the food container on the container platform; and
wherein the controller is configured to:
  trigger the first food-dispensing module to dispense a first amount of the first ingredient into the food container at the first location at a first time;
  access a first signal output by the weight sensor at the first time and representing a first weight of the food container at the first time;
  interpret a first dispensed amount of the first ingredient dispensed into the food container based on the first weight;
  characterize a difference between the first amount and the first dispensed amount; and
  in response to the difference exceeding a threshold difference, triggering the first food-dispensing module to dispense a second amount of the first ingredient into the food container based on the difference.

15. A food production system comprising:
a manual food preparation surface at work surface height;
a first module housing:
  supporting the manual food preparation surface;
  defining an autonomous assembly zone arranged below the manual food preparation surface and extending along a longitudinal assembly axis;
  configured to transiently house a first food-dispensing module configured to store and dispense units of a first ingredient toward the autonomous assembly zone; and
  comprising a first positioner module arranged within the autonomous assembly zone and comprising:
    a container platform configured to receive and support a food container;
    a set of positioner arms configured to cooperate to support and move the container platform across an assembly plane, coplanar the longitudinal assembly axis, to position the food container below food-dispensing modules for dispensation of ingredients into the food container; and
    a set of arm actuators arranged beneath the assembly plane, each arm actuator, in the set of arm actuators, defining a driveshaft, in a set of driveshafts, extending upward into the autonomous assembly zone and configured to transiently engage a positioner arm, in the set of positioner arms, to locate the positioner arm within the autonomous assembly zone; and
a controller configured to:
  receive a food order specifying the first ingredient;
  trigger actuation of the set of positioner arms, via the set of arm actuators, to move the container platform across the assembly plane and locate the food container in a first location beneath the first food-dispensing module; and
  trigger the first food-dispensing module to dispense the first ingredient into the food container at the first location.

16. The food production system of claim 15:
wherein the first module housing defines an outlet arranged coaxial the longitudinal assembly axis;
further comprising:
  a second module housing:
    defining a second autonomous assembly zone extending along the longitudinal assembly axis;
    defining an inlet arranged coaxial the longitudinal assembly axis and aligned to the outlet of the first module housing;
    configured to transiently house a second food-dispensing module configured to store and dispense units of a second ingredient toward the autonomous assembly zone;
    comprising a second positioner module arranged within the second autonomous assembly zone and comprising:
      a second container platform configured to receive and support the food container;
      a second set of positioner arms configured to cooperate to support and move the second container platform across a second assembly plane, coplanar the longitudinal assembly axis, to position the food container below food-dispensing modules for dispensation of ingredients into the food container; and
      a second set of arm actuators arranged beneath the second assembly plane, each arm actuator, in the second set of arm actuators, defining a driveshaft, in a second set of driveshafts, extending upward into the second autonomous assembly zone and configured to transiently engage a positioner arm, in the second set of positioner arms, to locate the positioner arm within the second autonomous assembly zone; and
    a handoff assembly arranged proximal the outlet and configured to:
      receive the food container from the container platform of the first positioner module; and
      locate the food container on the second container platform of the second positioner module; and
wherein the controller is configured to:
  receive the food order specifying the first ingredient and the second ingredient;
  trigger the second set of arm actuators to rotate the second set of positioner arms to move the second container platform across the second assembly plane and locate the food container in a second location beneath the second food-dispensing module;
  trigger the second food-dispensing module to dispense the second ingredient into the food container at the second location; and
  trigger the handoff assembly to transfer the food container from the container platform to the second container platform via the outlet of the first module housing and the inlet of the second module housing.

17. The food production system of claim 15:
wherein the first module housing is configured to transiently house a second food-dispensing module configured to store and dispense units of a second ingredient toward the autonomous assembly zone; and
wherein the controller is configured to:
  receive the food order specifying the first ingredient and the second ingredient;
  trigger actuation of the set of positioner arms, via the set of arm actuators, to move the container platform across the assembly plane and locate the food container in the first location beneath the first food-dispensing module;

trigger the first food-dispensing module to dispense the first ingredient into the food container at the first location;

trigger actuation of the set of positioner arms, via the set of arm actuators, to move the container platform across the assembly plane and locate the food container in a second location beneath the second food-dispensing module; and trigger the second food-dispensing module to dispense the second ingredient into the food container at the second location.

* * * * *